(12) United States Patent
Wu et al.

(10) Patent No.: US 12,372,641 B2
(45) Date of Patent: Jul. 29, 2025

(54) EGO VELOCITY ESTIMATOR FOR RADAR SYSTEMS

(71) Applicant: NXP B.V., Eindhoven (NL)

(72) Inventors: Ryan Haoyun Wu, San Jose, CA (US); Dongyin Ren, East Brunswick, NJ (US)

(73) Assignee: NXP B.V., Eindhoven (NL)

( * ) Notice: Subject to any disclaimer, the term of this patent is extended or adjusted under 35 U.S.C. 154(b) by 417 days.

(21) Appl. No.: 18/064,072

(22) Filed: Dec. 9, 2022

(65) Prior Publication Data

US 2024/0192353 A1   Jun. 13, 2024

(51) Int. Cl.
  G01S 13/60    (2006.01)
  G01S 13/58    (2006.01)
  G01S 13/931   (2020.01)

(52) U.S. Cl.
  CPC ............ *G01S 13/60* (2013.01); *G01S 13/584* (2013.01); *G01S 13/931* (2013.01); *G01S 2013/93271* (2020.01)

(58) Field of Classification Search
  CPC ...... G01S 13/60; G01S 13/584; G01S 13/931; G01S 2013/93271
  USPC .......................................................... 342/109
  See application file for complete search history.

(56) References Cited

U.S. PATENT DOCUMENTS

| | | | | |
|---|---|---|---|---|
| 5,051,750 A | * | 9/1991 | Hollister ................. | G01S 13/60 342/115 |
| 9,817,110 B2 | * | 11/2017 | Koerber .................. | G01S 7/032 |
| 9,921,305 B2 | * | 3/2018 | Cao ........................ | G01S 7/2927 |
| 11,016,174 B2 | * | 5/2021 | Campbell .............. | G01S 13/931 |
| 11,035,931 B1 | * | 6/2021 | Kipp ...................... | G01S 13/935 |
| 11,300,660 B2 | * | 4/2022 | Klotzbuecher ....... | G01S 13/536 |
| 11,428,798 B2 | * | 8/2022 | Keijer ................... | G01S 13/933 |
| 11,592,521 B1 | * | 2/2023 | Hassibi .................. | G01S 7/295 |

(Continued)

FOREIGN PATENT DOCUMENTS

| | | | | | |
|---|---|---|---|---|---|
| EP | | 3588129 A1 | * | 1/2020 | ............. G01S 13/50 |
| EP | | 4033269 A1 | * | 7/2022 | ............. G01S 13/08 |
| WO | WO-2021134449 A1 | | * | 7/2021 | ............. G01S 13/58 |

OTHER PUBLICATIONS

Cen et al., "Radar-only ego-motion estimation in difficult settings via graph matching," 2019 IEEE International Conference on Robotics and Automation (ICRA), 7 pages.

(Continued)

*Primary Examiner* — Nuzhat Pervin

(57) ABSTRACT

A radar system includes transmitter and receiver antennas positioned to illuminate and receive reflections from a ground surface, a processor, and a non-transitory computer-readable medium. The processor obtains ground reflections, the corresponding ranges, and measured radial velocities, and determines a set of test ego velocities. For each test ego velocity and ground reflection, the processor generates a test radial velocity. The processor determines an absolute difference between the test radial velocity and the measured radial velocity, and whether the absolute difference satisfies a criterion. In response to satisfying the criterion, the absolute difference is accumulated into a total cost for the test ego velocity. After each ground reflection and test ego velocity is analyzed, the processor compares the total costs for the test ego velocities to obtain a smallest total cost and corresponding test ego velocity. The test ego velocity is an ego velocity of the radar system.

20 Claims, 12 Drawing Sheets

(56) References Cited

U.S. PATENT DOCUMENTS

| | | | | |
|---|---|---|---|---|
| 11,774,574 | B2* | 10/2023 | Iurgel | G01S 13/913 |
| | | | | 342/147 |
| 12,130,353 | B2* | 10/2024 | Lessmann | G01S 7/356 |
| 12,130,356 | B2* | 10/2024 | Michelini | G01S 7/415 |
| 2005/0116854 | A1* | 6/2005 | Beez | H01Q 19/062 |
| | | | | 342/107 |
| 2007/0109177 | A1* | 5/2007 | Baath | G01S 13/88 |
| | | | | 342/25 C |
| 2018/0364330 | A1* | 12/2018 | Klotzbuecher | G01S 13/42 |
| 2019/0377081 | A1* | 12/2019 | Fujitsu | G01S 7/352 |
| 2020/0174115 | A1* | 6/2020 | Prados | G01S 13/931 |
| 2020/0191936 | A1* | 6/2020 | Witter | G01S 13/584 |
| 2020/0241124 | A1* | 7/2020 | Fei | G01S 13/88 |
| 2020/0386883 | A1* | 12/2020 | Hofmann | G01S 13/584 |
| 2021/0018592 | A1* | 1/2021 | Laghezza | G01S 13/34 |
| 2021/0055383 | A1* | 2/2021 | Lee | G01S 13/325 |
| 2022/0171022 | A1* | 6/2022 | Bourde | G01S 7/4095 |
| 2022/0171069 | A1* | 6/2022 | Hamilton | G01S 13/931 |
| 2022/0236400 | A1* | 7/2022 | Iurgel | G01S 13/4463 |
| 2023/0161026 | A1* | 5/2023 | Grebner | G01S 15/931 |
| | | | | 342/113 |
| 2024/0077601 | A1* | 3/2024 | Wang | G01S 13/584 |
| 2024/0159889 | A1* | 5/2024 | Carlström | G01S 13/931 |
| 2024/0255273 | A1* | 8/2024 | Acker | G01B 9/02094 |

OTHER PUBLICATIONS

Kellner et al., "Instantaneous Ego-Motion Estimation using Doppler Radar," IEEE International Conference on Robotics and Automation • Oct. 2013, 6 pages.

Fischler et al., "Random Sample Consensus: A Paradigm for Model Fitting with Applications to Image Analysis and Automated Cartography", Communications of the ACM, vol. 24, Issue 6, Jun. 1981, 15 pages.

* cited by examiner

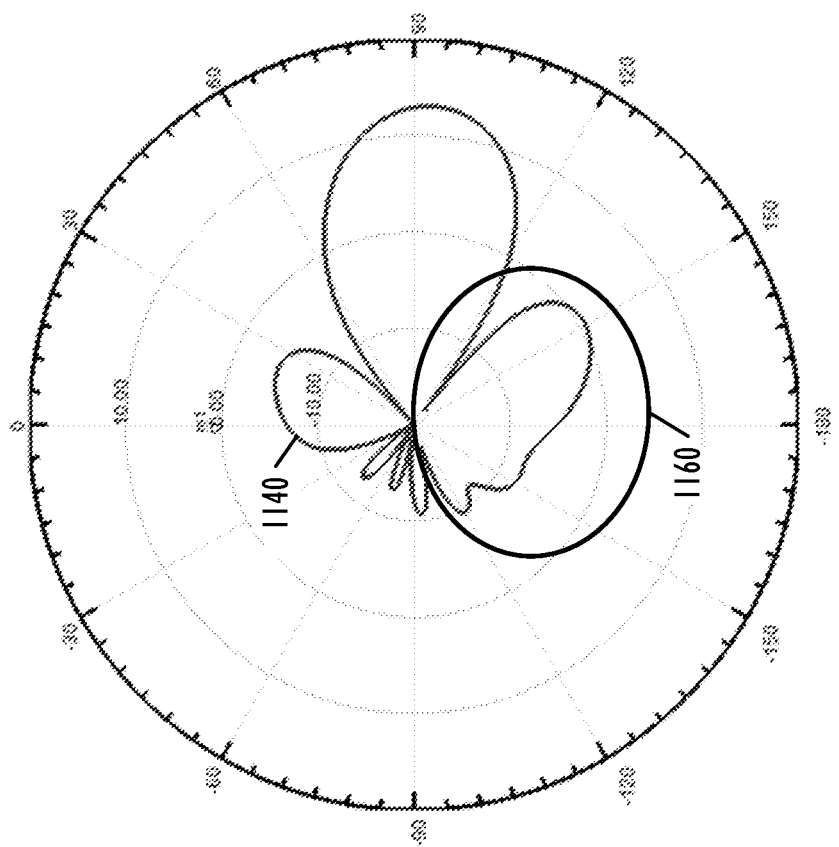

EGO VELOCITY ESTIMATOR FOR RADAR SYSTEMS

BACKGROUND

Some radar systems are included in vehicles as part of automated driving assistance systems and used to assist in perception of environments around the vehicles. To accurately represent the environment and particularly the motion of detected objects in the environment, a radar system must account for the motion of the radar system itself due to the movement of the vehicle in which the radar system is included. Some techniques for determining the motion of the radar system, also called the ego velocity of the radar system, use multiple radar frames, tracked objects in the environment, or both and are computationally expensive. Other techniques for determining the ego velocity of the radar system are accurate only in certain environments, such as environments with many stationary objects and few moving objects.

BRIEF DESCRIPTION OF THE DRAWINGS

The present invention may be better understood, and its numerous objects, features, and advantages made apparent to those skilled in the art by referencing the accompanying drawings.

FIG. 11 shows an example transmitter antenna radiation pattern for illuminating a ground surface from which to determine the ego velocity of the radar system, according to one embodiment.

The use of the same reference symbols in different drawings indicates identical items unless otherwise noted. The Figures are not necessarily drawn to scale.

DETAILED DESCRIPTION

As discussed previously herein, some techniques for determining the ego velocity of a radar system use multiple radar frames, tracked objects in the environment, or both and are computationally expensive and time-consuming. Other techniques for determining the ego velocity of the radar system are accurate only in certain environments, such as environments with many stationary objects and few moving objects. The disclosed techniques and radar systems implementing the disclosed techniques are able to determine the ego velocity of a radar system based on a single radar frame, making the disclosed techniques faster than techniques that require multiple radar frames. In addition, the disclosed techniques do not require object tracking, making the disclosed techniques less computationally expensive than techniques that require object tracking in the environment. Further, the disclosed techniques make use of ground reflections near the radar system such that the disclosed techniques are not dependent on the particular environment, making the disclosed techniques more consistent than techniques that are accurate only in environments with many stationary objects and few moving objects.

Figure 1:
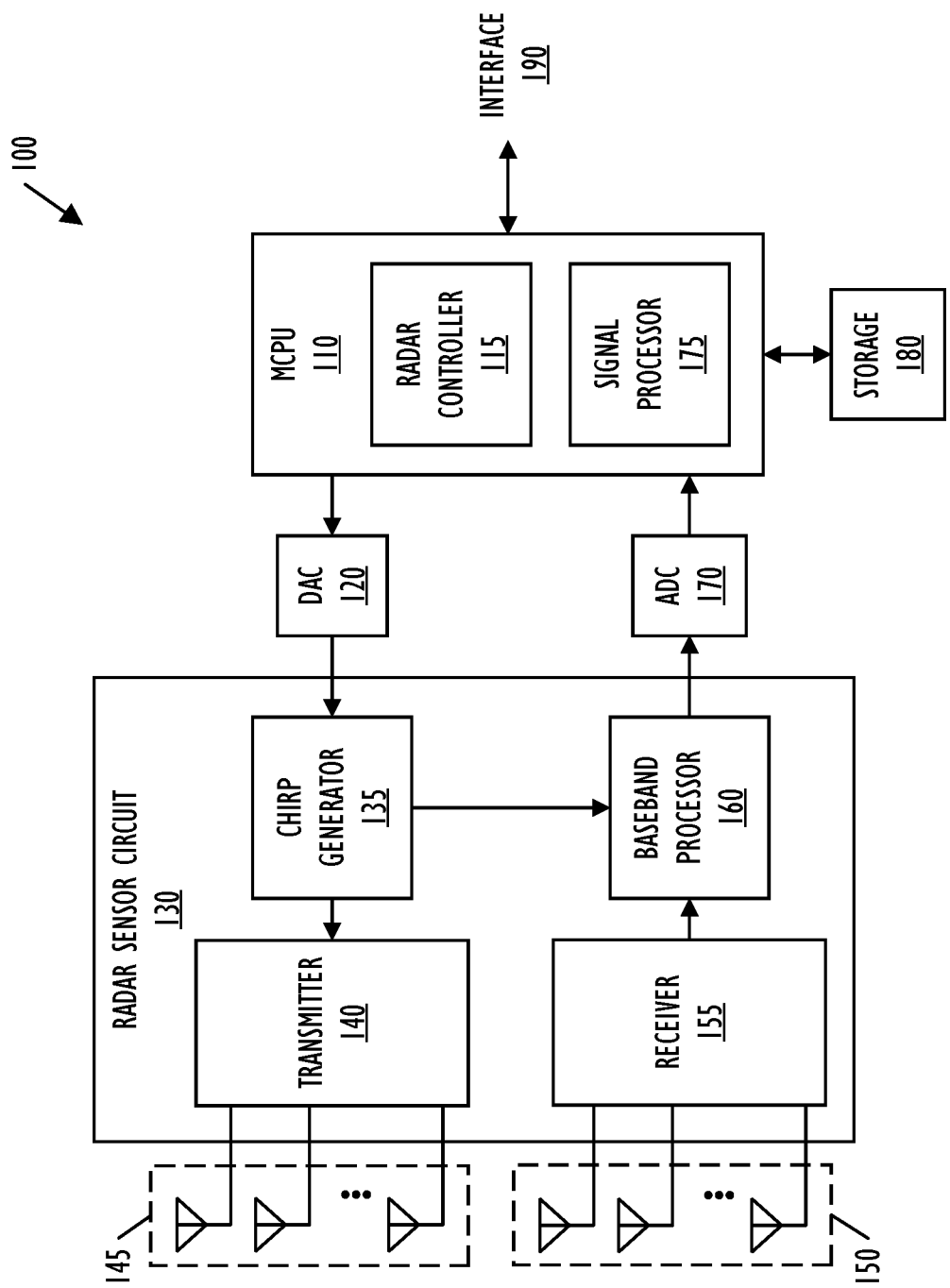
FIG. 1 shows, in block diagram form, an example radar system, according to one embodiment.

FIG. 1 shows, in block diagram form, an example radar system 100, according to an embodiment. Radar system 100 can be included in a vehicle, such as for an automotive driver assistance system. The example radar system 100 is a frequency-modulated continuous wave (FMCW) radar system, also referred to as a continuous-wave frequency-modulated (CWFM) radar, and capable of determining the distance or range, velocity, and angle of arrival of an object in the field of view of radar system 100. The term "angle of arrival" of an object is used herein to indicate the angle of arrival of a signal reflected off the object relative to the alignment of the radar system. Although radar system 100 is described herein as a linear chirp radar system, any appropriate radar system that generates range-Doppler information can be used.

In this example, radar system 100 includes a microcontroller and processor unit (MCPU) 110, a digital-to-analog converter (DAC) 120, a radar sensor circuit 130, a first antenna array 145, a second antenna array 150, an analog-to-digital converter (ADC) 170, and storage 180. The MCPU 110 comprises one or more MCPU cores, general purpose processing cores, array or vector processing cores, parallel processing cores, graphic processing units, neural net and linear algebra accelerators, field-programmable gate arrays, digital signal processors, application-specific integrated circuits, and the like, or any combination thereof. The term "MCPU" in the singular is used herein to refer to either a single or multiple of the MCPU cores, general purpose processing cores, array or vector processing cores, parallel processing cores, graphic processing units, digital signal processors, neural net and linear algebra accelerators, application-specific integrated circuits, field-programmable gate arrays, and the like, or any combination thereof comprised in the MCPU 110.

MCPU 110 includes a radar controller 115 and a signal processor 175. The radar controller 115 can receive data from the radar sensor circuit 130 and control radar parameters of the radar sensor circuit 130 such as frequency band, length of a radar frame, and the like via the DAC 120. A control signal from DAC 120 can be used to adjust the radar chirp signals output from a chirp generator 135 included in radar sensor circuit 130. The signal processor 175 in MCPU 110 can also receive the data from the radar sensor circuit 130 and perform signal processing for determining a distance or range between a target object and radar system 100, a radial velocity of the target object, an angle of arrival for the target object, and the like. The signal processor 175 can provide the calculated values to the storage 180 and/or to other systems via the interface 190.

The interface 190 can enable the MCPU 110 to communicate with other systems over local and wide area networks, the internet, automotive communication buses, and/or other kinds of wired or wireless communication systems, for example. The MCPU 110 can provide the calculated values over the interface 190 to other systems, such as a radar-camera-lidar fusion system; an automated driving assistance system including parking, braking, or lane-change assistance features; and the like. The storage 180 can be used to store instructions for the MCPU 110, received data from the radar sensor circuit 130, calculated values from the signal processor 175, and the like. Storage 180 can be any appropriate storage medium, such as a volatile or non-volatile memory.

The radar sensor circuit 130 includes the chirp generator 135, a transmitter 140, a receiver 155, and a baseband processor 160. The chirp generator 135 can include a local oscillator, for example, and generates radar chirp signals and provides them to the transmitter 140. For example, the chirp generator 135 frequency can modulate a continuous wave signal to form a series of linear chirp signals. The transmitted chirp signal of a known, stable frequency continuous wave varies up and down in frequency over a fixed period of time by the modulated signal. The chirp generator 135 provides the generated chirp signals to the transmitter 140, which drives the first antenna array 145 of one or more transmitter (TX) antennas. The second antenna array 150 comprises one or more receiver (RX) antennas and receives signals reflected from objects in the path of the transmitted chirp signals from the TX antenna array 145. The TX antenna array 145 and the RX antenna array 150 can be stationary or configured to transmit and receive across a range of area, such as by mechanical movement.

The receiver 155 receives the reflected signals from the RX antenna array 150 and provides them to the baseband processor 160. The baseband processor 160 also receives the transmitted chirp signals from the chirp generator 135 and down-converts the received chirp signals directly into the baseband using the copy of the transmitted chirp signals from the chirp generator 135. The baseband processor 160 can then filter and amplify the baseband signal. The baseband processor 160 provides the filtered and amplified baseband signal to the ADC 170, which digitizes the signal and provides it to the MCPU 110. The signal processor 175 in the MCPU 110 can then perform time domain to frequency domain transforms such as fast Fourier transforms (FFTs) and other signal processing to determine the distance, radial velocity, and angle of arrival between the target object and the radar system 100.

Frequency differences between the received reflections and the transmitted chirp signal increase with delay and so are proportional to distance. The phase differences between the received reflections across consecutive chirps in a radar frame are indicative of the velocity of objects in the field of view. For implementations in which RX antenna array 150 includes two or more receiver antennas, the phase difference between received reflections at a first RX antenna and received reflections at a second RX antenna can be used to determine the angle of arrival of target objects. For example, the down-converted and digitized receive signal corresponding to each chirp is first transformed using an FFT (called the range FFT). The range FFT produces a series of range bins with the value of each range bin denoting the signal strength of reflected targets at the corresponding range. A further "Doppler" FFT is then performed for each range bin across all the chirps in a frame to estimate the velocities of reflected targets. Additional processing can then be performed to determine the angle of arrival between the targets and the radar system 100. Although the radar system 100 is described herein as implementing FFT-based range-Doppler processing, any appropriate transforms may be used to produce the range-Doppler information.

For an implementation in which the radar system 100 is included in a vehicle with an automated driving assistance system, the automated driving assistance system can use the determined distance, velocity, and angle of arrival for objects in the field of view from the radar system 100 to provide parking, braking, or lane-change assistance. To provide meaningful driving assistance, the radar system 100 must account for the movement of the vehicle, also called the vehicle's ego velocity, and the corresponding movement of the radar system 100. Radar systems according to the disclosed invention can determine the ego velocity of the vehicle based on radar reflections off the ground.

Figure 2:
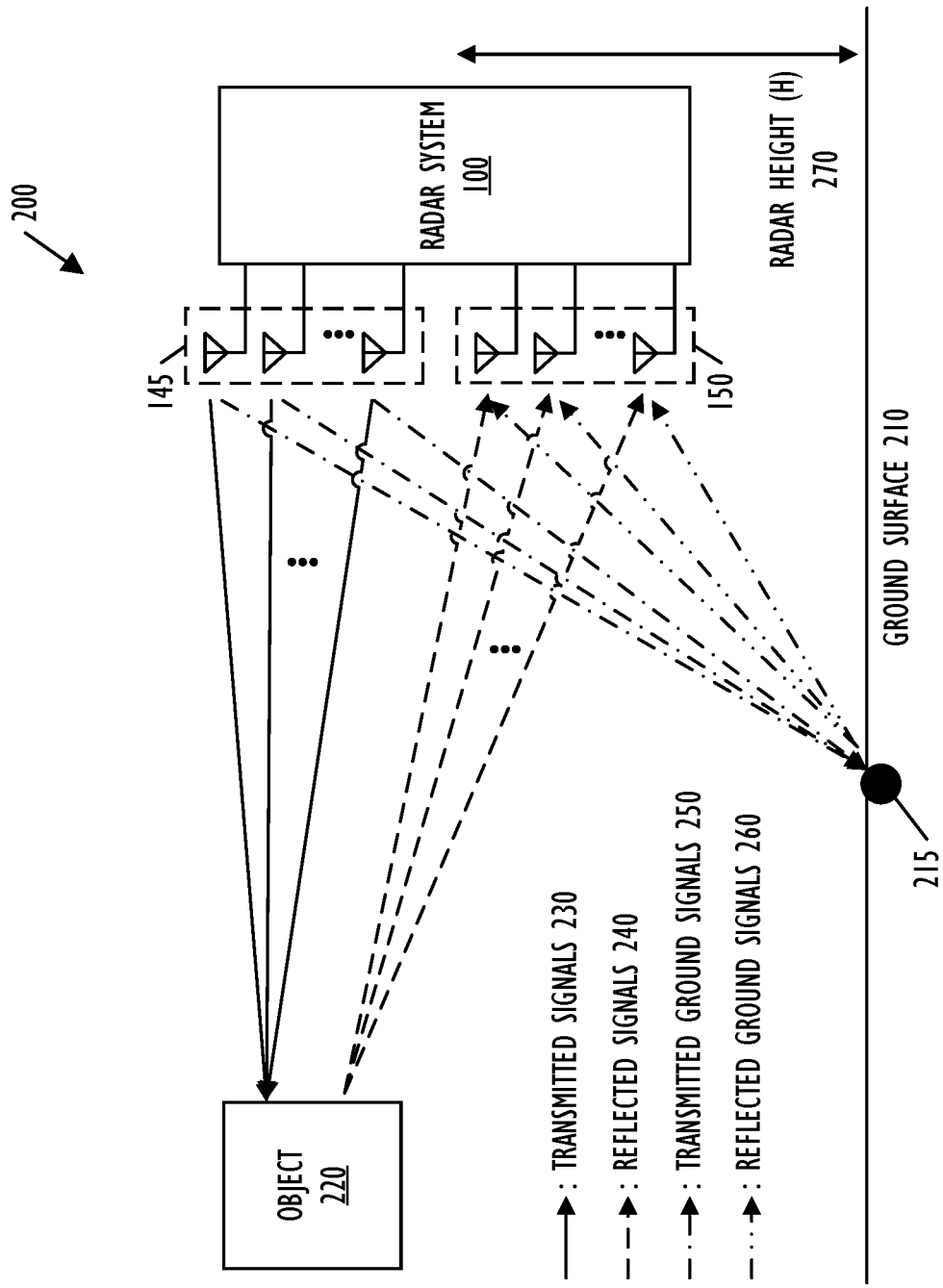
FIG. 2 shows a diagram of transmitted and received signals from the example radar system shown in FIG. 1 in an example environment.

FIG. 2 shows a diagram 200 of transmitted and received signals from the example radar system 100 shown in FIG. 1 in an example environment. For ease of illustration, the diagram 200 is described herein with respect to the radar system 100 shown in FIG. 1. The radar system 100 transmits signals 230 from the TX antenna array 145, which are reflected off of object 220 in the environment and are received as the reflected signals 240 by the RX antenna array 150. In addition, the TX antenna array 145 transmits ground signals 250, which are reflected off of a ground reflection point 215 on a ground surface 210. Although the ground surface 210 is shown as flat and smooth in this example illustration, the ground surface 210 can be sloped, textured, or both. The reflected ground signals 260 are received by the RX antenna array 150. Based on the reflected ground signals 260 and a known height 270 of the radar system 100 on the vehicle relative to the ground surface 210, the radar system 100 can determine the ego velocity of the vehicle.

Figure 3:
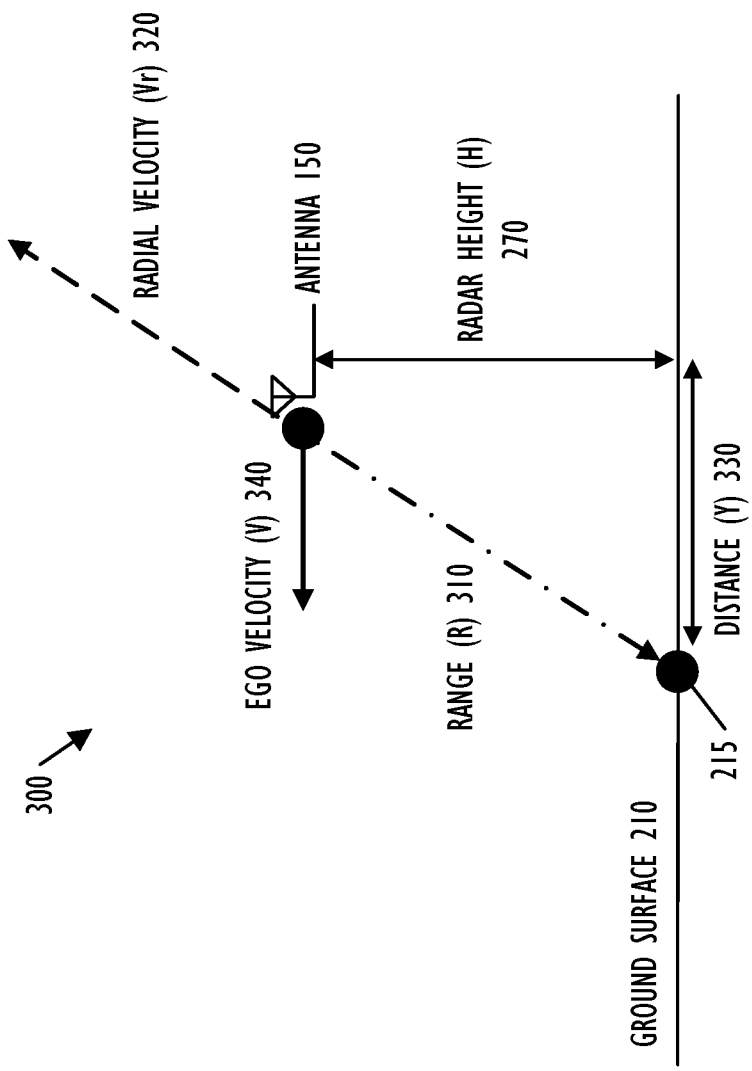
FIG. 3 shows a diagram of an antenna from the example radar system shown in FIG. 1 and corresponding distances and velocities.

FIG. 3 shows a diagram 300 of an antenna in the RX antenna array 150 from the example front or forward-facing radar system 100 shown in FIG. 1 and corresponding distances and velocities. In this example, the radar system 100 is positioned on a front bumper of a vehicle. For ease of illustration, the diagram 300 is described herein with reference to the radar system shown in FIG. 1 and the diagram 200 shown in FIG. 2. A range R 310 between the antenna 150 and the ground reflection point 215 on the ground surface 210 can be calculated using a range FFT, and a longitudinal ground distance Y 330 between the radar system 100 and the ground reflection point 215 can be calculated based on the known radar height H 270 and the calculated range R 310. The distance Y 330 can be represented as:

$$Y=\sqrt{(R)^2-(H)^2} \qquad (1)$$

The radial velocity Vr 320 can be measured using a Doppler FFT, and used with the ground distance Y 330 to analyze a set of test ego velocities. The term "radial velocity" as used herein refers to round-trip radial velocity. Each test ego velocity Vtest in the set of test ego velocities is used to determine a test radial velocity Vr_test. Assuming there is no motion to either side, the test radial velocity Vr_test can be represented as:

$$Vr\_\text{test} = -2(Vtest)\left(\frac{Y}{R}\right) \qquad (2)$$

The particular test ego velocity Vtest corresponding to the test radial velocity Vr_test that is most similar to the measured radial velocity Vr 320 can be used as the ego velocity (V) 340. The process for determining the ego velocity V 340 is described further herein with respect to the example process 400 shown in flow chart form in FIGS. 4A-B.

As noted previously, the radar system 100 is positioned on the front bumper of a vehicle and can experience side-to-side or lateral motion, as well as forward or longitudinal motion. To represent longitudinal and lateral motion, the scalar ego velocity V 340 indicates the speed of the radar system 100 and a scalar angle $\theta$ indicates the direction angle of the radar system 100 in radians. For example, the forward or longitudinal direction can be "north," and the angle $\theta$ is positive while the direction angle of the radar system 100 is "east" relative to the "north" forward direction. The angle $\theta$ is negative while the direction angle of the radar system 100 is "west" relative to the "north" forward direction. The combination of the ego speed and the angle $\theta$ indicates the ego motion velocity V 340 of the radar system 100.

For ego motion in the "north" and "east" directions—that is, forward and to the right—the ego velocity vector V_ego can be represented as:

$$V\_ego = Vx + Vy \quad (3)$$

where Vx represents the "eastward" motion and Vy represents the "northward" motion or the radar system 100. The ego speed V 340 of the radar system 100 is the norm of V_ego and can be represented as:

$$V = \sqrt{Vx^2 + Vy^2} \quad (4)$$

The "eastward" motion Vx and the "northward" motion Vy can be represented as:

$$Vx = V(\sin \theta) \quad (5)$$

$$Vy = V(\cos \theta) \quad (6)$$

As a result, the ego velocity vector V_ego can be represented as:

$$V\_ego = V(\sin \theta) + V(\cos \theta) \quad (7)$$

A forward-looking radar system 100 captures a majority of ground reflections in the forward direction, in particular in response to the antenna arrays in the radar system 100 having radiation patterns that have a narrow field of view (FoV). For antenna arrays having wide-angle horizontal or azimuthal FoV, the forward-looking radar system 100 handles ground reflections that are significantly angled relative to the forward direction of the radar system 100 differently than ground reflections that are not significantly angled relative to the forward direction. That is, ground reflections that are angled more steeply than a particular threshold from the center of the wide-angle horizontal or azimuthal FoV are processed differently. The particular threshold can be chosen based on the size of the wide-angle horizontal or azimuthal FoV, the desired accuracy of the determined ego velocity, and the like.

For a particular ground reflection i that is significantly angled, the position vector Pi can be represented as:

$$Pi = Xi + Yi + Zi \quad (8)$$

where Xi represents the lateral or side-to-side position, Yi represents the longitudinal or forward-backward position, and Zi represents the height or elevation position. The directional vector Di from the position of the radar system 100 to the ith particular ground reflection can be represented as:

$$Di = \frac{Xi}{Ri} + \frac{Yi}{Ri} + \frac{Zi}{Ri} \quad (9)$$

where Ri represents the measured range between the radar system 100 and the particular ground reflection i. The measured range Ri can be represented as:

$$Ri = \sqrt{(Xi)^2 + (Yi)^2 + (Zi)^2} \quad (10)$$

In equation (1), it is assumed that the elevation Zi is approximately the height H 270 of the radar system and that the ground reflections are in the forward or longitudinal direction with negligible lateral position Xi, and so the longitudinal position Yi can be approximated as shown in equation (1).

The measured radial velocity Vr_i of the ith ground reflection can be represented as:

$$\begin{aligned} Vr\_i &\cong -2((V\_ego) * (Di)) = \\ &-2(V\sin(\theta) + V\cos(\theta)) \cdot \left(\left(\frac{Xi}{Ri}\right) + \left(\frac{Yi}{Ri}\right) + \left(\frac{Zi}{Ri}\right)\right) = \\ &-2\left(\left(\frac{Xi * V}{Ri}\right)\sin(\theta) + \left(\frac{Yi * V}{Ri}\right)\cos(\theta)\right) \end{aligned} \quad (11)$$

For motion such as the vehicle and radar system 100 making a turn, the test ego velocities incorporate both the ego speed V and the angle $\theta$ and are tested against the position vectors D and the measured radial velocities Vr of the ground reflections.

A particular test ego velocity Vtest with a particular ego speed Vn and a particular angle $\theta$m can be represented as:

$$V\text{test}(Vn, \theta m) = (Vn)\sin(\theta m) + (Vn)\cos(\theta m) \quad (12)$$

where a two-dimensional search grid along the V dimension and a search grid along the $\theta$ dimension is included, for ground targets' position vector Di and measured radial velocities Vr_i. Vn represents the n-th value on the speed V search grid, and $\theta$m represents the m-th value on the angle $\theta$'s search grid. The (n, m)-th test for the ego velocity vector, Vtest, can be represented as Vtest (Vn, Om). A test radial velocity Vr_test for the test ego velocity Vtest (Vn, $\theta$m) and a particular ith ground reflection can be represented as:

$$Vr\_\text{test}(i, Vn, \theta m) = -2\left(\left(\frac{Xi * Vn}{Ri}\right)\sin(\theta m) + \left(\frac{Yi * V_n}{Ri}\right)\cos(\theta m)\right) \quad (13)$$

The test ego velocity Vtest having the ego speed V and the angle $\theta$ that results in a set of test radial velocities Vr_test(i, Vn, $\theta$m) for all values of i in a set of ground reflections that are most similar to the measured radial velocities Vr of the set of ground reflections can be used as the ego motion of the vehicle and the radar system 100.

For ego motion in which the lateral motion is negligible, that is, the angle $\theta$ is approximately equal to zero, the set of test ego velocities can focus on the ego speed V alone. For ego motion in which the lateral motion is not negligible, the radar system 100 is able to detect ground reflections at large off-forward direction angles using appropriately angled antenna arrays or antenna arrays with appropriate FoVs. For example, a forward-looking radar system 100 with large azimuth FoV or positioning the radar system 100 at an angle, a corner of the vehicle, or a side of the vehicle can be used to provide the ground reflections.

Assuming the radar system 100 is not tilted or angled towards the ground, the broadside pointing angle b_i of the radar system 100 can be represented as:

$$b\_i = Xb + Yb \tag{14}$$

where Xb represents the lateral position of the radar system 100 and Yb represents the longitudinal position of the radar system 100. The relationship between the lateral position Xb and the longitudinal position Yb can be represented as:

$$\sqrt{(Xb)^2 + (Yb)^2} = 1 \tag{15}$$

For a radar system 100 with a narrow FoV, ground reflections are detected mostly along the broadside direction of the radar system 100, such that the latitudinal position Xi and longitudinal position Yi of a particular ith ground reflection can be represented as:

$$Xi \approx Xb \sqrt{(Ri)^2 - H^2} \tag{16}$$

$$Yi \approx Yb \sqrt{(Ri)^2 - H^2} \tag{17}$$

As a result, the measured radial velocity of particular ith ground reflection can be represented as:

$$Vr\_i = -2\left(\left(\frac{Xb\sqrt{(Ri)^2 - H^2}}{Ri}\right) V \sin(\theta) + \left(\frac{Yb\sqrt{(Ri)^2 - H^2}}{Ri}\right) V \cos(\theta)\right) \tag{18}$$

Similarly, the test radial velocity Vr_test for a test ego velocity (Vn, θm) and the particular ith ground reflection can be represented as:

$$Vr\_\text{test}(i, Vn, \theta m) = -2\left(\left(\frac{Xb\sqrt{(Ri)^2 - H^2}}{Ri}\right)(Vn) \sin(\theta m) + \left(\frac{Yb\sqrt{(Ri)^2 - H^2}}{Ri}\right)(Vn) \cos(\theta m)\right) \tag{19}$$

For a forward-facing radar system 100 with ego motion in which the lateral motion is negligible, that is, the angle θ is approximately equal to zero, the lateral position Xb of the radar system 100 is approximately equal to zero, and the longitudinal position Yb of the radar system 100 is approximately equal to one. The set of test ego velocities can focus on the ego speed V alone, and the measured radial velocity Vr for a particular ith ground reflection can be represented as:

$$Vr\_i \cong -2\left(\frac{\sqrt{(Ri)^2 - H^2}}{Ri}\right) V \tag{20}$$

Similarly, the test radial velocity Vr_test for the test ego speed Vn and the particular ith ground reflection can be represented as:

$$Vr\_\text{test}(i, Vn) \cong -2\left(\frac{\sqrt{(Ri)^2 - H^2}}{Ri}\right) Vn \tag{21}$$

For a backward-facing radar system 100 with ego motion in which the lateral motion is negligible, that is, the angle θ is approximately equal to zero, the lateral position Xb of the radar system 100 is approximately equal to zero, and the longitudinal position Yb of the radar system 100 is approximately equal to negative one. The set of test ego velocities can focus on the ego speed V alone, and the measured radial velocity Vr for a particular ith ground reflection can be represented as:

$$Vr\_i \cong 2\left(\frac{\sqrt{(Ri)^2 - H^2}}{Ri}\right) V \tag{22}$$

Similarly, the test radial velocity Vr_test for the test ego speed Vn and the particular ith ground reflection can be represented as:

$$Vr\_\text{test}(i, Vn) \cong 2\left(\frac{\sqrt{(Ri)^2 - H^2}}{Ri}\right) Vn \tag{23}$$

Whether the ego motion of the radar system 100 includes both lateral and longitudinal motion or longitudinal motion and negligible lateral motion, the ego velocity V 340 is estimated by finding the particular test ego velocity Vtest that minimizes the differences between the set of test radial velocities Vr_test and the measured radial velocities Vr of the set of ground reflections. For example, the test ego velocity Vtest having the ego speed V and the angle θ that results in a set of test radial velocities Vr_test that are most similar to the measured radial velocities Vr of the set of ground reflections can be found by searching for the test ego velocity Vtest(Vn, θm) that minimizes a cost function based on the differences between the test radial velocities Vr_test(i, Vn, θm) and the measured radial velocities Vr(i) for all values of i in the set of ground reflections. For example, a least-square error cost function can be used, such that the cost for a particular test ego velocity Vtest(Vn, θm) over a set of ground reflections can be represented as:

$$\text{COST}(Vn, \theta m) = \sqrt{\sum_i (Vr\_i - Vr\_\text{test}(i, Vn, \theta m))^2} \tag{24}$$

For ease of illustration, the process 400 is described herein with reference to the radar system shown in FIG. 1 affixed to a vehicle and the diagrams 200 and 300 shown in FIGS. 2 and 3, respectively. The process 400 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 400 are shown in a particular order in FIGS. 4A-B, but the steps of process 400 may be performed in a different order and/or with some steps performed simultaneously. One or more steps of process 400 can be optional, and process 400 can include additional steps.

Figure 4A:
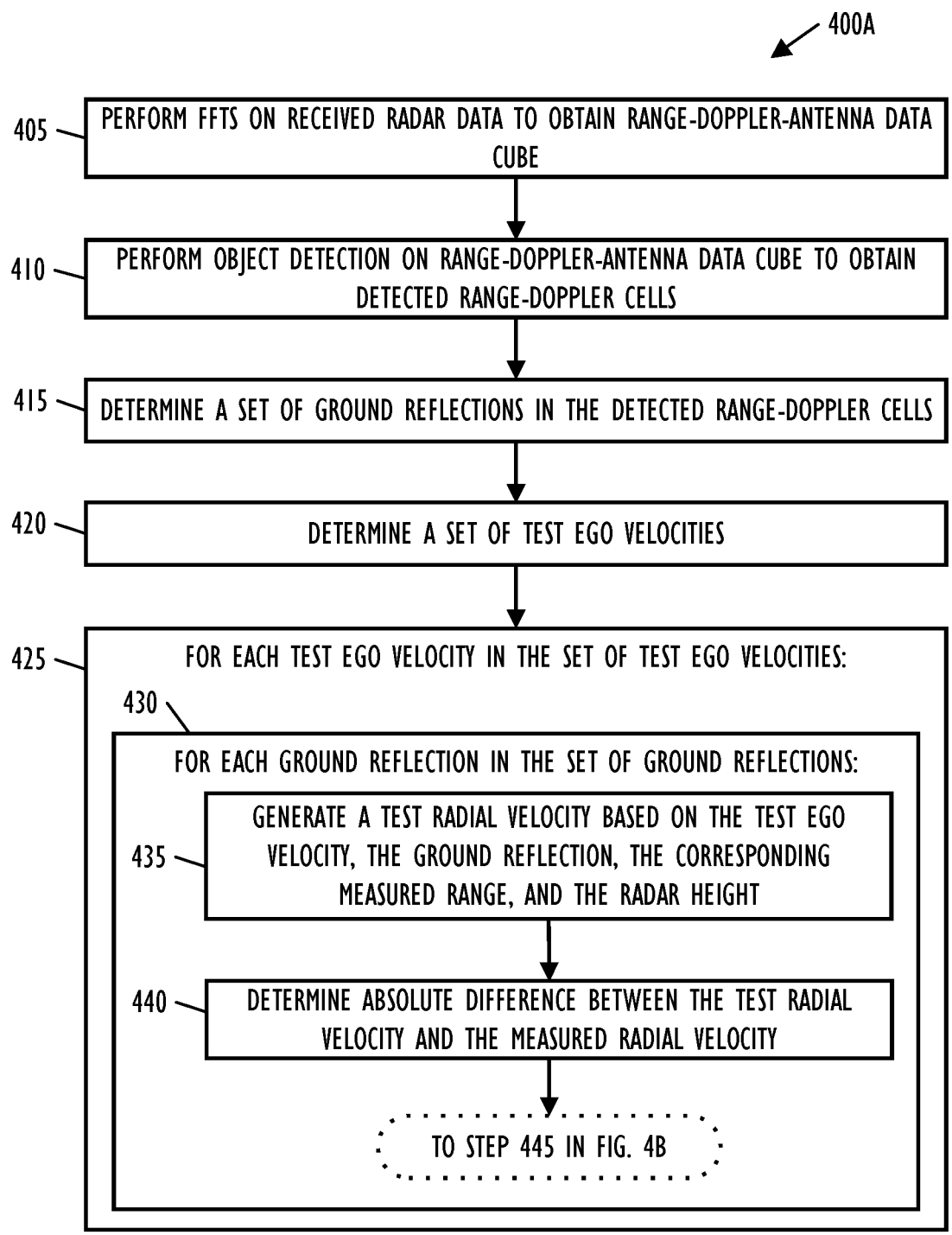
FIGS. 4A-B show, in flow chart form, an example process for determining the ego velocity of a radar system, according to one embodiment.

The process 400 begins at step 405 on FIG. 4A, at which the signal processor 175 performs FFTs on the received radar data to obtain a range-doppler-antenna data cube of one or more antennas. That is, the signal processor 175 performs a first FFT on the received radar data for each antenna in the RX antenna array 150 to obtain a range-antenna data array and a second FFT on the range-antenna data array to obtain a range-doppler-antenna data cube that indicates a signal strength for the received radar data at each range bin and velocity bin. At step 410, the signal processor 175 performs object detection on the range-doppler-antenna data cube to obtain detected range-doppler cells. For example, the signal processor 175 identifies range and velocity bins with a signal strength that satisfies an object detection criterion.

At step 415, the signal processor 175 determines a set of reflected ground signals 260 in the detected range-doppler cells. For example, the RX antenna array 150 can include one or more antennas radiated towards the ground surface 210 by means of antenna radiation pattern design, transmit array beamforming, receive array beamforming, physically tilting of the aperture, or a combination of any of the above, such that signals received by those particular antennas can be identified as reflected ground signals 260. At step 420, the signal processor 175 determines a set of test ego velocities. The set of test ego velocities can be determined based on the expected ego velocity of the radar system 100. For example, the radar system 100 is included in a vehicle and the vehicle has speeds between 0 meters per second (m/s) and 27 m/s, approximately 60 miles per hour. The set of test ego velocities can include a number N of test ego velocities between 0 m/s and 27 m/s, such as a set of 27 test ego velocities including 1 m/s, 2 m/s, 3 m/s, and the like through 27 m/s. The number N and incrementation of the set of test ego velocities can be determined based on the expected range of ego velocities for the radar system 100 and a desired resolution of the determined ego velocity of the radar system 100.

At step 425, the signal processor 175 performs steps 430 and 460 for each test ego velocity Vtest in the set of test ego velocities. At step 430, the signal processor 175 performs steps 435, 440, 445, and 450 or 455 for each ground reflection in the set of identified reflected ground signals 260. That is, the signal processor 175 performs steps 435, 440, 445, 450, 460, and 450 or 455 for every combination of test ego velocity in the set of test ego velocities and ground reflection in the set of reflected ground signals 260. At step 435, the signal processor 175 generates a test radial velocity Vr_test based on the particular test ego velocity Vtest, the particular ground reflection, the corresponding measured range R 310, and the known radar height H 270. For example, the signal processor 175 can generate the test radial velocity Vr_test, for example based on equations (20) and (21) for forward-facing radar systems, equations (22) and (23) for rear-facing radar systems, and equations (18) and (19) for angled radar systems described herein with reference to FIG. 3. At step 440, the signal processor 175 determines an absolute difference between the test radial velocity Vr_test and the measured radial velocity Vr 320.

Figure 4B:
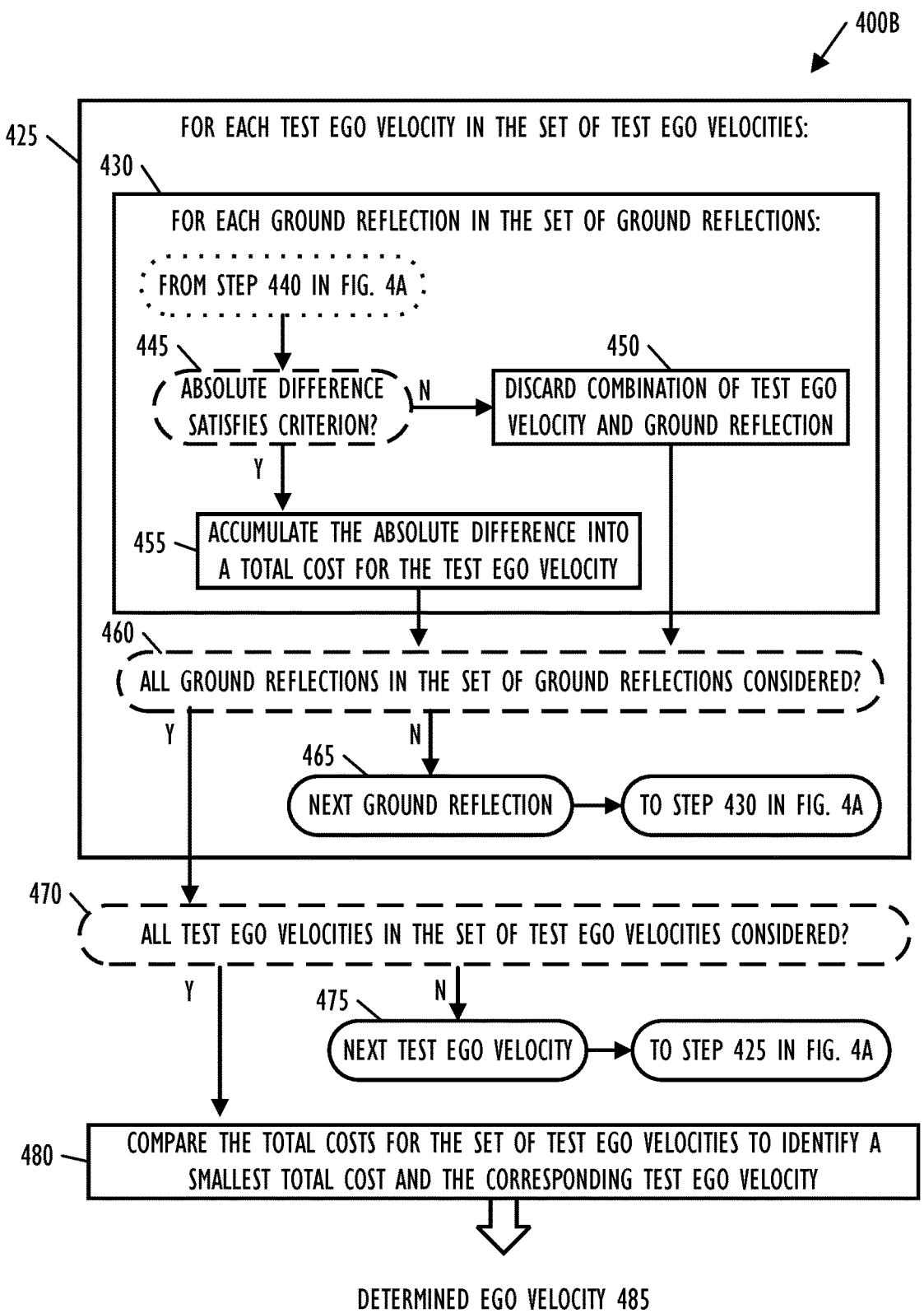

The process 400 continues in FIG. 4B with step 445, at which the signal processor 175 determines whether the absolute difference between the test radial velocity Vr_test and the measured radial velocity Vr 320 satisfies a criterion. The criterion can be indicative of an error tolerance to remove outliers, and can represent an acceptable maximum difference between the test radial velocity Vr_test and the measured radial velocity Vr 320, for example. If the absolute difference does not satisfy the criterion at step 445, the signal processor 175 discards the combination of the particular test ego velocity Vtest and the particular ground reflection at step 450 and proceeds to step 460. If the absolute difference satisfies the criterion at step 445, the signal processor 175 accumulates the absolute difference into a total cost for the particular test ego velocity Vtest at step 455 and proceeds to step 460. The total cost for the particular test ego velocity Vtest can represent an overall similarity between the test radial velocities Vr_test using a particular test ego velocity Vtest across the set of ground reflections and the corresponding measured radial velocities Vr 320 across the set of ground reflections. For example as shown in equation (24) the total cost can be a least-square error cost for the particular test ego velocity Vtest.

At step 460, the signal processor 175 determines whether all ground reflections in the set of reflected ground signals 260 have been considered with respect to the particular test ego velocity Vtest. If not all ground reflections in the set of reflected ground signals 260 have been considered, the signal processor 175 proceeds to step 465 and obtains the next ground reflection in the set of reflected ground signals 260. The signal processor 175 then returns to step 430 shown in FIG. 4A to perform steps 435, 440, 445, and 450 or 455 with the same particular test velocity Vtest and the next ground reflection. If the signal processor 175 determines at step 460 that all ground reflections in the set of reflected ground signals 260 have been considered with respect to the particular test ego velocity Vtest, the signal processor 175 proceeds to step 470.

At step 470, the signal processor 175 determines whether all test ego velocities Vtest in the set of test ego velocities have been considered. If not all test ego velocities Vtest in the set of test ego velocities have been considered, the signal processor 175 proceeds to step 475 and obtains the next test ego velocity Vtest in the set of test ego velocities. The signal processor 175 then returns to step 425 shown in FIG. 4A to perform steps 430 and 460 with the next test ego velocity Vtest. If the signal processor 175 determines at step 470 that all test ego velocities Vtest in the set of test ego velocities have been considered, the signal processor 175 proceeds to step 480 and compares the total costs for the set of test ego velocities to identify a smallest total cost and the corresponding test ego velocity. That is, the signal processor 175 identifies the particular test ego velocity Vtest from the set of test ego velocities that generates test radial velocities Vr_test most similar to the measured radial velocities Vr 320. The particular test ego velocity Vtest identified at step 480 is output as the determined ego velocity 485.

Figure 5:
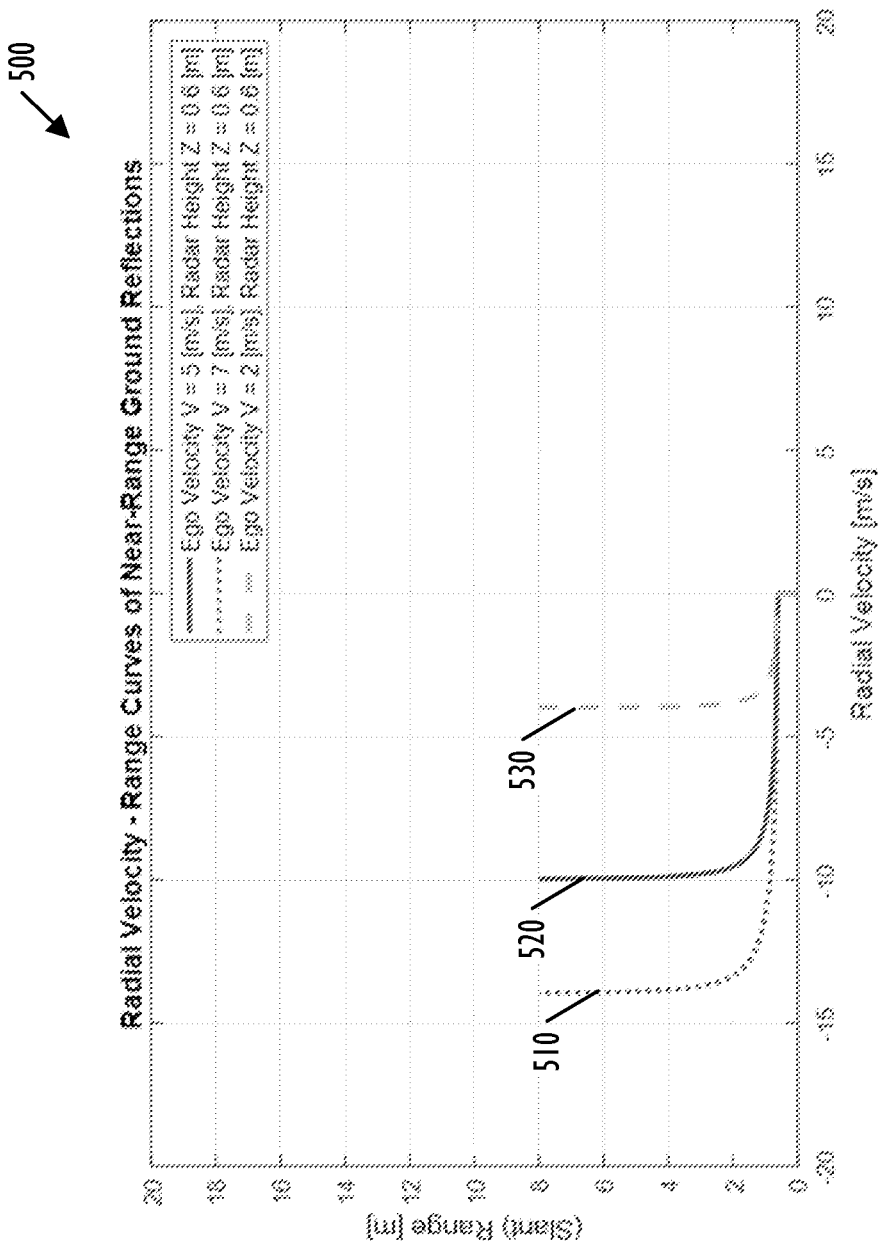
FIG. 5 shows a graph of radial velocity-range curves for a set of test ego velocities.

FIG. 5 shows a graph 500 of estimated radial velocity-range curves for a set of three test ego velocities. The radar system corresponding to the radial velocity-range curves has a height Z of approximately 0.6 m. The curve 510 illustrates a range over test radial velocity Vr_test for a test ego velocity Vtest of approximately 5 m/s. The test radial velocity Vr_test approaches an asymptote at approximately −13 m/s and curves at a near range between 0 and 2 m, corresponding to ground reflections. The curve 520 illustrates a range over test radial velocity Vr_test for a test ego velocity Vtest of approximately 7 m/s. The test radial velocity Vr_test approaches an asymptote at approximately −10 m/s and curves at a near range between 0 and 2 m, corresponding to ground reflections. The curve 530 illustrates a range over test radial velocity Vr_test for a test ego velocity Vtest of approximately 2 m/s. The test radial velocity Vr_test approaches an asymptote at approximately −3 m/s and curves at a near range between 0 and 2 m, corresponding to ground reflections.

Figure 6:
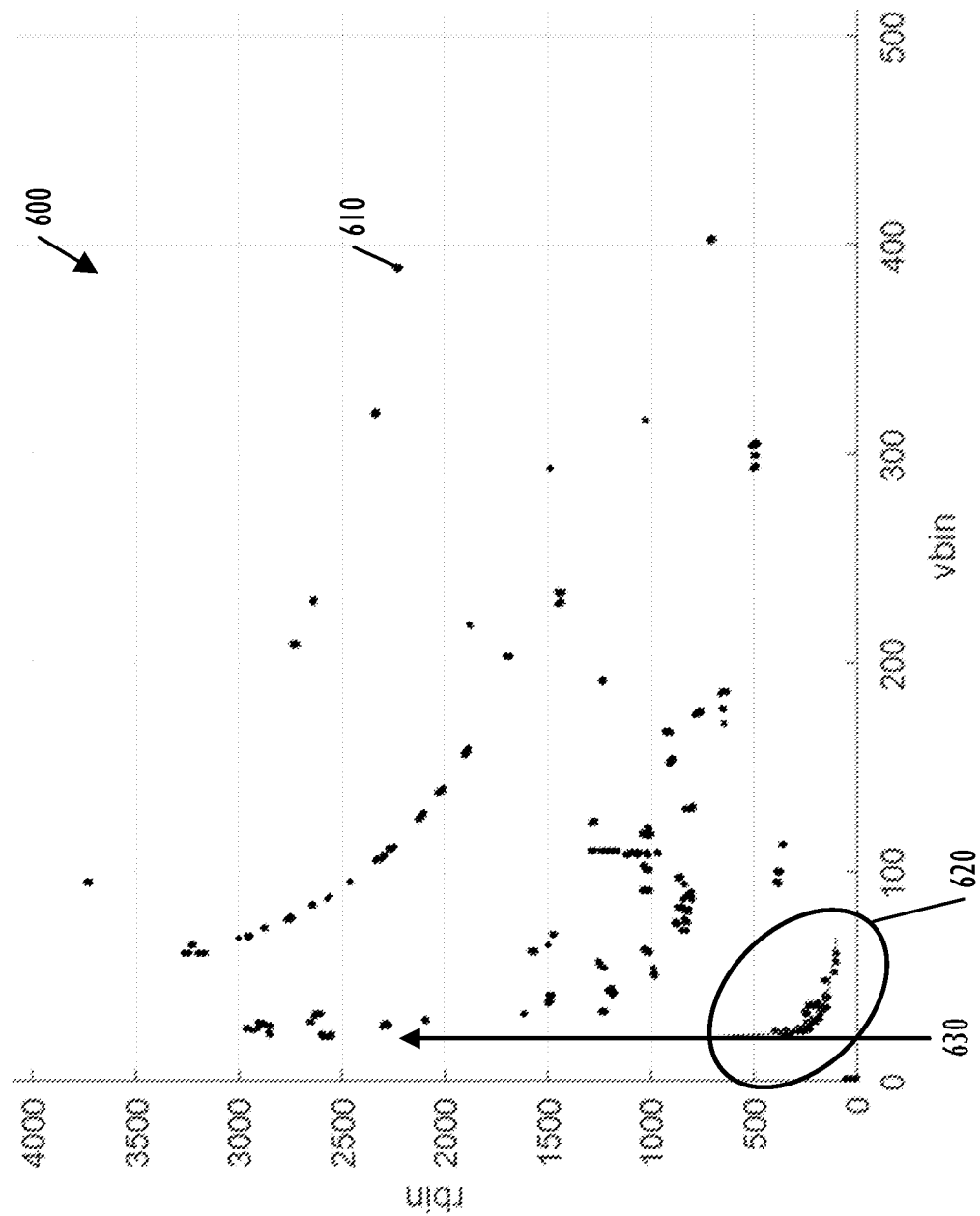
FIG. 6 shows a graph of detected objects and a set of ground reflections.

The ground reflections, for example the set of reflected ground signals 260 determined by the signal processor 175 at step 415 in process 400, can be overlaid with curves 510, 520, and 530, and the curve that best matches the overlaid ground reflections can be used to approximate the ego velocity of the radar system. To illustrate, FIG. 6 shows a graph 600 of detected objects 610 at the corresponding range and radial velocity bins and a set of reflected ground signals 260 indicated in the region 620. For ease of illustration, the graph 600 is described herein with respect to the radar system 100 shown in FIG. 1, the diagrams 200 and 300 shown in FIGS. 2 and 3, respectively, and the graph 500 shown in FIG. 5. The asymptote 630 indicates the actual ego velocity V 340 of the radar system 100, and one of the curve 510, 520, and 530 fits the set of reflected ground signals 260 indicated in the region 620 more closely than the others of curves 510, 520, and 530. The best-fit curve approaches the asymptote 630 and the corresponding test ego velocity Vtest can be used to approximate the actual ego velocity of the radar system.

Figure 7:
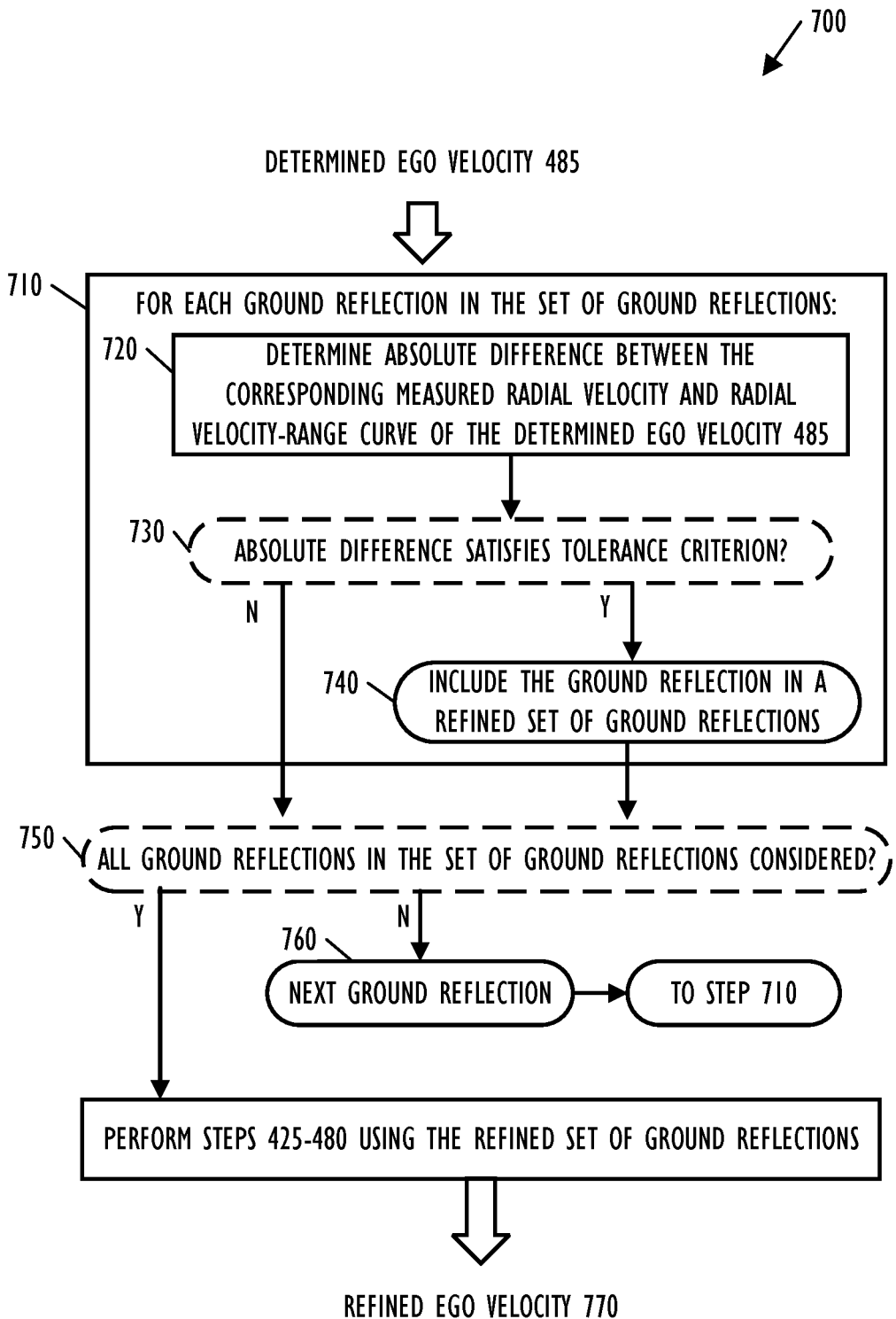
FIG. 7 shows, in flow chart form, an example process for refining the estimated ego velocity determined by the process described in FIGS. 4A-B, according to one embodiment.

FIG. 7 shows, in flow chart form, an example process 700 for refining the estimated ego velocity 485 determined by the process 400 described in FIGS. 4A-B. For ease of illustration, the process 700 is described herein with reference to the radar system shown in FIG. 1 affixed to a vehicle, the diagrams 200 and 300 shown in FIGS. 2 and 3, respectively, and the process 400 shown in FIGS. 4A-B. The process 700 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 700 are shown in a particular order in FIG. 7, but the steps of process 700 may be performed in a different order and/or some steps may be performed simultaneously. One or more steps of process 700 can be optional, and process 700 can include additional steps.

The process begins at step 710, at which signal processor 175 performs steps 720 and 730, and optionally step 740, for each ground reflection in the set of reflected ground signals 260. At step 720, the signal processor 175 determines an absolute difference between the measured radial velocity Vr 320 corresponding to the particular ground reflection and the radial velocity-range curve of the determined ego velocity 485. At step 730, the signal processor 175 determines whether the absolute difference between the measured radial velocity Vr 320 and the radial velocity-range curve of the determined ego velocity 485 satisfies a tolerance criterion. The tolerance criterion can be indicative of an acceptable threshold of difference between the measured radial velocity Vr 320 and the determined ego velocity 485, for example, and be chosen based on a desired accuracy of the process 700.

If the absolute difference does not satisfy the tolerance criterion at step 730, the signal processor 175 proceeds to step 750. If the absolute difference satisfies the tolerance criterion at step 730, the signal processor 175 includes the particular ground reflection in a refined set of ground reflections and proceeds to step 750. The signal processor determines whether all ground reflections in the set of reflected ground signals 260 have been considered at step 750. If not all ground reflections in the set of reflected ground signals 260 have been considered, the signal processor 175 proceeds to step 760 and obtains the next ground reflection in the set of reflected ground signals 260. The signal processor 175 then returns to step 710 to perform steps 720 and 730 and optionally step 740 with the next particular ground reflection. If the signal processor 175 determines at step 750 that all ground reflections in the set of reflected ground signals reflections 260 have been considered, the signal processor 175 proceeds to perform steps 425 through 480 of process 400 using the refined set of ground reflections. The ego velocity determined based on the refined set of ground reflections can be used as the refined ego velocity V 770.

Figure 8:
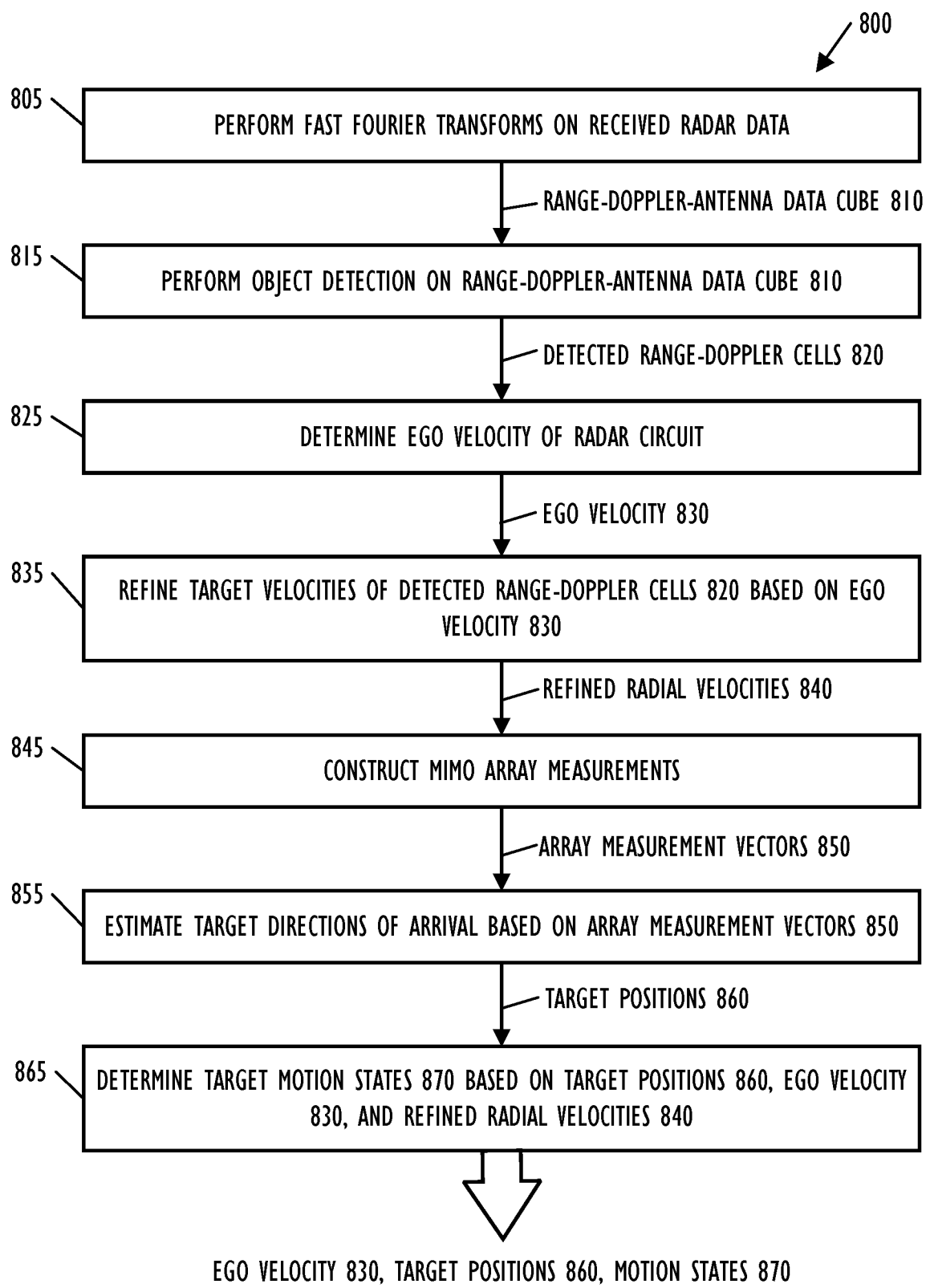
FIG. 8 shows, in flow chart form, an example process for analyzing received radar data, according to one embodiment.

FIG. 8 shows, in flow chart form, an example process 800 for analyzing received radar data. For ease of illustration, the process 800 is described herein with reference to the radar system shown in FIG. 1, the diagrams 200 and 300 shown in FIGS. 2 and 3, respectively, and the processes 400 and 700 shown in FIGS. 4A-B and 7. The process 800 is described herein as being performed by the signal processor 175 in the MCPU 110 executing instructions stored in storage 180 of the radar system 100, but can be performed by any appropriate processing unit executing instructions stored in any appropriate non-transitory computer-readable medium. The steps of process 800 are shown in a particular order in FIG. 8, but the steps of process 800 may be performed in a different order and/or some steps may be performed simultaneously. One or more steps of process 800 can be optional, and process 800 can include additional steps.

The process 800 begins at step 805, at which the signal processor 175 performs FFTs on the received radar data to obtain a range-doppler-antenna data cube 810. That is, the signal processor 175 performs a first FFT on the received radar data for each antenna in the RX antenna array 150 to obtain a range-antenna data array and a second FFT on the range-antenna data array to obtain the range-doppler-antenna data cube 810 that indicates a signal strength for the received radar data at each range bin and velocity bin. At step 815, the signal processor 175 performs object detection on the range-doppler-antenna data cube 810 to obtain detected range-doppler cells 820. For example, the signal processor 175 identifies range and velocity bins with a signal strength that satisfies an object detection criterion.

At step 825, the signal processor 175 determines the ego velocity V 340 of the radar circuit 100, for example using steps 415 through 480 of process 400 and optionally refining the determined ego velocity using process 700. At step 835, the signal processor 175 refines the target velocities of detected range-doppler cells 820 based on the ego velocity 830 to obtain refined radial velocities 840. That is, the signal processor 175 refines the target velocities to account for the motion of the radar system 100. For example, a particular detected range-doppler cell 820 having a velocity opposite the ego velocity 830 can be refined to reflect that the particular detected object is stationary.

At step 845, the signal processor 175 constructs multiple-input multiple-output (MIMO) measurements to obtain array measurement vectors 850. At step 855, the signal processor 175 estimates target directions of arrival for detected objects 820 based on the array measurement vectors 850 to obtain target positions 860. At step 865, the signal processor 175 determines target motion states 870 for the detected objects 820 based on the target positions 860, the ego velocity 830, and the refined radial velocities 840. For example, the signal processor 175 can determine if the detected objects 820 are stationary, moving towards the radar system 100, or moving away from the radar system 100, as illustrated in FIG. 9.

Figure 9:
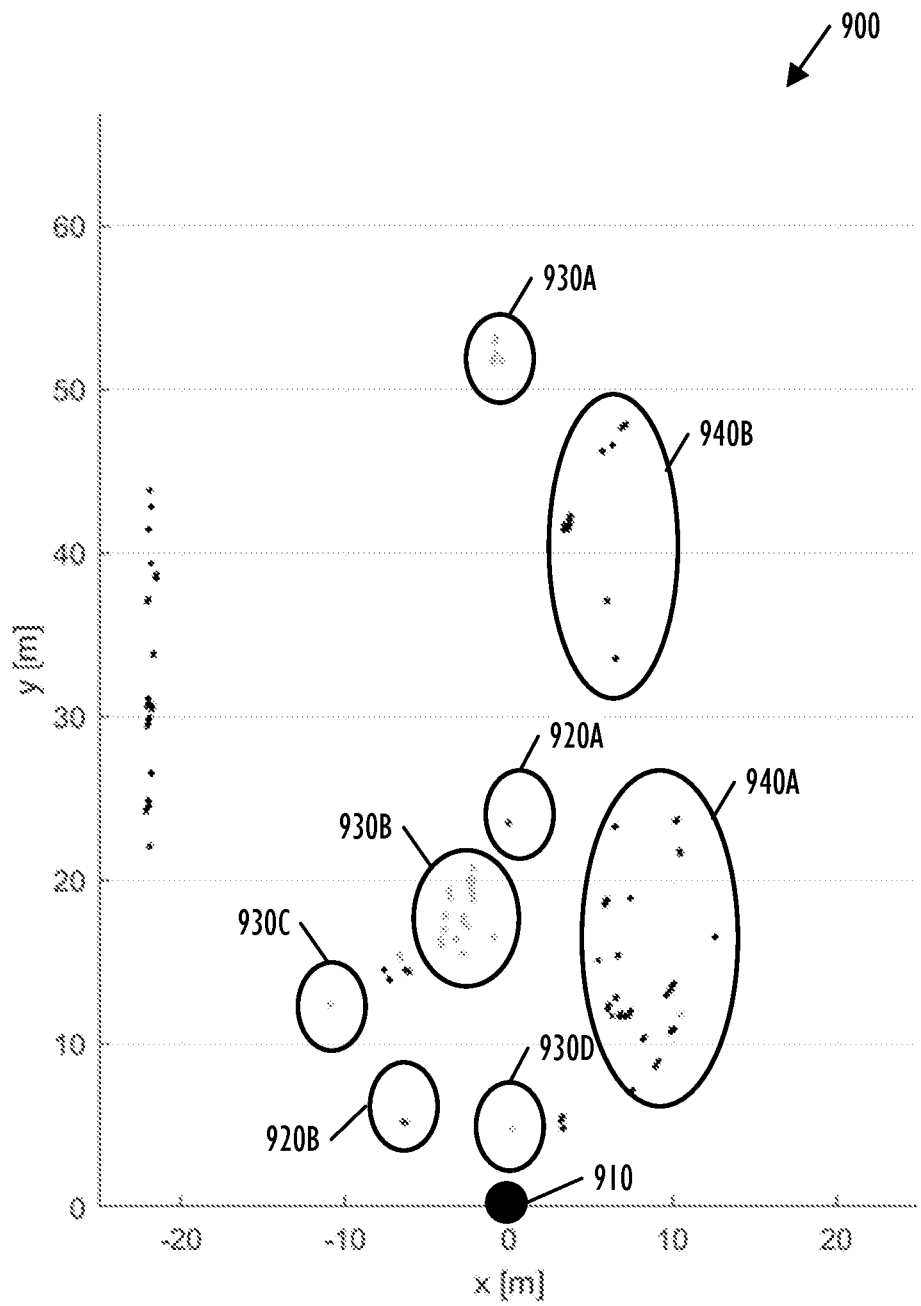
FIG. 9 shows a graph of detected objects and their corresponding motion states.

FIG. 9 shows a graph 900 of detected objects and their corresponding motion states. For ease of illustration, the graph 900 is described herein with reference to the radar system 100 shown in FIG. 1. The graph 900 shows the position 910 of the radar system 100. In graph 900, the x-axis shows a lateral distance in meters from the position 910 of the radar system 100, and the y-axis shows a longitudinal distance in meters from the position 910 of the radar system 100. The detected objects indicated in regions 920A-B have a motion state that indicates the detected objects are moving in generally the opposite direction as the radar system 100. The detected objects indicated in regions 930A-D have a motion state that indicates the detected objects are moving in generally the same direction as the radar system 100. The detected objects indicated in regions 940A-B have a motion state that indicates the detected objects are generally stationary relative to the radar system 100.

Figure 10:
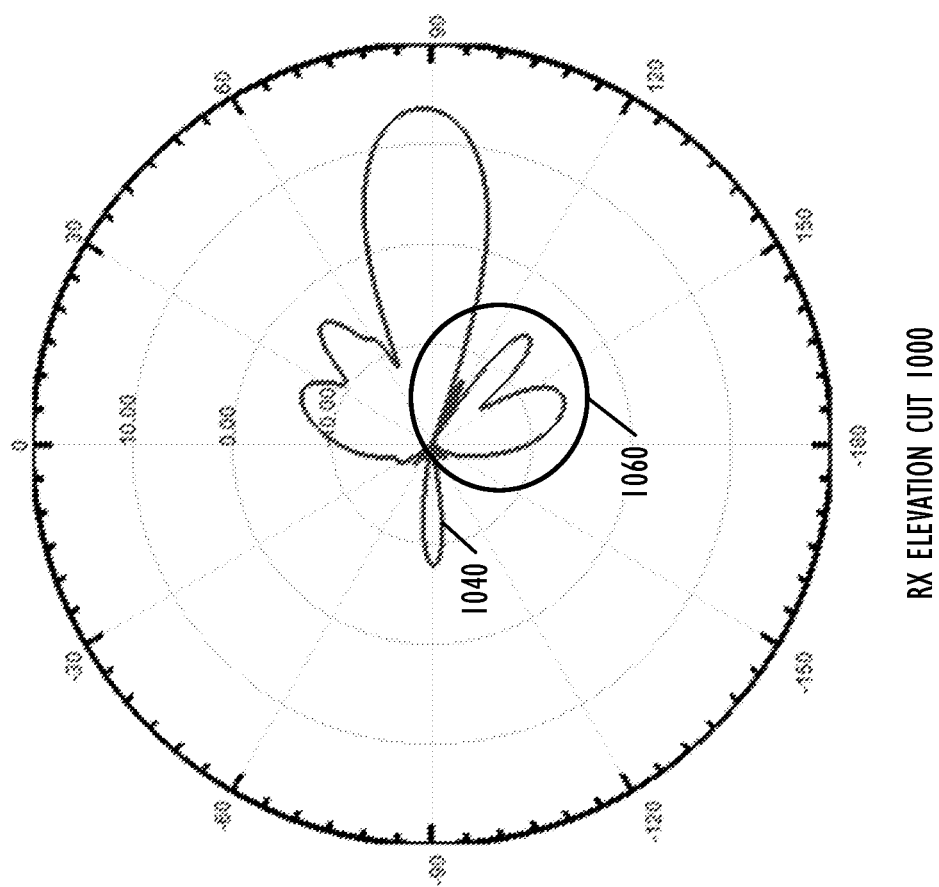
FIG. 10 shows an example receiver antenna radiation pattern for detecting ground reflections from which to determine the ego velocity of the radar system, according to one embodiment.

FIGS. 10 and 11 show example RX and TX antenna radiation patterns for detecting ground reflections from which to determine the ego velocity of the radar system. Although FIGS. 10 and 11 show the radiation patterns for only a single RX antenna and TX antenna, respectively, the radar system can include multiple RX and TX antennas. In FIG. 10, the RX elevation cut 1000 showing the radiation pattern 1040 includes lobes indicated by region 1060 which are configured to receive ground reflections. In FIG. 11, the TX elevation cut 1100 showing the radiation pattern 1140 includes lobes indicated by region 1160 which are directed towards the ground such that the ego velocity of the radar system due to the motion of the vehicle can be determined based on the ground reflections, as described herein with respect to process 400 shown in FIGS. 4A-B.

The example antenna radiation patterns shown in FIGS. 10 and 11 are for illustration only, and any appropriate antenna configuration that enables ground reflections to be received can be used.

As described herein, the disclosed techniques for determining the ego velocity of a radar system use a single radar frame, rather than multiple radar frames; do not use tracked objects; and rely on ground reflections, rather than reflections off objects in the environment which makes the accuracy dependent on the characteristics of the environment. Using the known height of the radar system, calculated ranges of ground reflections, and a set of test ego velocities, estimated radial velocities can be determined and compared to the measured radial velocities. The test ego velocity that generates estimated radial velocities most similar to the measured radial velocities can be used as the ego velocity of the radar system.

Features specifically shown or described with respect to one embodiment set forth herein may be implemented in other embodiments set forth herein.

In this description, the term "couple" may cover connections, communications, or signal paths that enable a functional relationship consistent with this description, including intermediate or intervening components that do not alter the functional relationship. A device that is "configured to" perform a task or function may be configured by programming or hardwiring, for example, at a time of manufacturing by a manufacturer and/or may be configurable or reconfigurable by a user after manufacturing. The configuring may be done through firmware and/or software, construction and/or layout of hardware components and connections, or any combination thereof. As used herein, "node", "pin", and "lead" are used interchangeably. A circuit or device described herein as including certain components may be adapted to be coupled to those components instead, to form the described circuitry or device.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

A radar system includes at least one transmitter (TX) antenna positioned to illuminate a ground surface, at least one receiver (RX) antenna positioned to receive ground reflections, at least one processor, and at least one non-transitory computer-readable medium storing machine instructions executable by the at least one processor. The processor obtains a set of ground reflections and corresponding ranges and measured radial velocities and determines a set of test ego velocities.

For each particular test ego velocity in the set of test ego velocities and each particular ground reflection in the set of ground reflections, the processor generates a test radial velocity based on the particular test ego velocity, the particular ground reflection, the corresponding range, and a height of the radar system relative to the ground surface. The processor determines an absolute difference between the test radial velocity and the corresponding measured radial velocity and whether the absolute difference satisfies a criterion indicative of a maximum acceptable difference. In response to the absolute difference satisfying the criterion, the processor accumulates the absolute difference into a total cost for the particular test ego velocity. After determining a total cost for each test ego velocity in the set of test ego velocities, the processor compares the total costs to obtain a smallest total cost and a corresponding particular test ego velocity. The processor uses the particular test ego velocity as an ego velocity of the radar system.

In some embodiments, the criterion is a first criterion and the total costs are first total costs. The machine instructions further cause the processor to, for each particular ground reflection in the set of ground reflections, determine an absolute difference between the corresponding measured radial velocity and the ego velocity and whether the absolute difference satisfies a second criterion indicative of a second maximum acceptable difference. In response to the absolute difference satisfying the second criterion, the processor includes the particular ground reflection in a refined set of ground reflections.

For each particular test ego velocity in the set of test ego velocities and each particular ground reflection in the refined set of ground reflections, the processor generates a test radial velocity based on the particular test ego velocity, the particular ground reflection, the corresponding range, and the height of the radar system. The processor determines an absolute difference between the test radial velocity and the corresponding measured radial velocity and whether the absolute difference satisfies the first criterion. In response to the absolute difference satisfying the first criterion, the processor accumulates the absolute difference into a second total cost for the particular test ego velocity. After determining a second total cost for each test ego velocity in the set of test ego velocities, the processor compares the second total costs for the set of test ego velocities to obtain an updated smallest total cost and a corresponding updated particular test ego velocity. The processor uses the updated particular test ego velocity as the ego velocity of the radar system.

In some embodiments, the radar system is affixed to a vehicle. In some implementations, the radar system is forward-facing relative to the vehicle, and the machine instructions cause the processor to, for each particular test ego velocity and each particular ground reflection, generate the test radial velocity by determining a longitudinal distance Y between the radar system and a ground reflection point corresponding to the particular ground reflection and determining the test radial velocity. The test radial velocity is represented as:

$$\text{Vr\_test} = -2(Vtest)\left(\frac{Y}{R}\right),$$

wherein Vr_test represents the test radial velocity, Vtest represents the particular test ego velocity, and R represents the corresponding range. The longitudinal distance Y between the radar system and the ground reflection point is represented as:

$$Y=\sqrt{(R)^2-(H)^2},$$

wherein H represents the height of the radar system.

In some implementations, the radar system is rear-facing relative to the vehicle, and the machine instructions cause the processor to, for each particular test ego velocity and each particular ground reflection, generate the test radial velocity by determining a longitudinal distance Y between the radar system and a ground reflection point corresponding to the particular ground reflection and determining the test radial velocity. The test radial velocity is represented as:

$$\text{Vr\_test} = 2(Vtest)\left(\frac{Y}{R}\right),$$

wherein Vr_test represents the test radial velocity, Vtest represents the particular test ego velocity, and R represents the corresponding range.

In some implementations, the radar system faces sideways relative to the vehicle, and each test ego velocity comprises an ego speed Vtest and an angle θ. The machine instructions cause the processor to, for each particular test ego velocity and each particular ground reflection, generate the test radial velocity by determining a longitudinal distance Y between the radar system and a ground reflection point corresponding to the particular ground reflection and determining the test radial velocity. The test radial velocity is represented as:

$$\text{Vr\_test} = -2\left(\left(\frac{(Xb)Y}{R}\right)(Vtest)\sin(\theta) + \left(\frac{(Yb)Y}{R}\right)(Vtest)\cos(\theta)\right),$$

wherein Vr_test represents the test radial velocity, Xb represents a lateral position of the radar system, Yb represents a longitudinal position of the radar system, and R represents the corresponding range.

In some implementations, the machine instructions cause the processor to obtain the set of ground reflections and corresponding ranges and radial velocities by transmitting radar signals from the at least one TX antenna and obtaining received radar signals form the at least one RX antenna. The processor performs transforms on the received radar signals to obtain a range-doppler-antenna cube and object detection on the range-doppler-antenna cube to obtain detected range-doppler cells. The processor then determines the set of ground reflections and the corresponding ranges and radial velocities from the detected range-doppler cells.

In some implementations, the non-transitory computer-readable medium further comprises machine instructions which, when executed by the at least one processor, cause the processor to refine radial velocities of the detected range-doppler cells based on the ego velocity of the radar system. The processor constructs multiple-input multiple-output (MIMO) array measurement vectors for the detected range-doppler cells and estimates directions of arrival for objects indicated by the detected range-doppler cells based on the array measurement vectors to obtain positions of the objects. The processor then determines motion states of the objects based on the positions of the objects, the ego velocity of the radar system, and the refined radial velocities.

A method for determining an ego velocity of a radar system includes obtaining, from the radar system, a set of ground reflections and corresponding ranges and radial velocities and determining a set of test ego velocities. For each particular test ego velocity in the set of test ego velocities and each particular ground reflection in the set of ground reflections, a test radial velocity is generated based on the particular test ego velocity, the particular ground reflection, the corresponding range, and a height of the radar system. An absolute difference between the test radial velocity and the corresponding measured radial velocity is determined and whether the absolute difference satisfies a criterion. In response to the absolute difference not satisfying the criterion, the absolute difference is accumulated into a total cost for the particular test ego velocity. The total costs for the set of test ego velocities are compared to obtain a smallest total cost and a corresponding test ego velocity. The corresponding test ego velocity is used as an ego velocity of the radar system.

In some implementations, the criterion is a first criterion, and the total costs are first total costs. The method can further include, for each particular ground reflection in the set of ground reflections, determining an absolute difference between the corresponding measured radial velocity and the particular test ego velocity and whether the absolute difference satisfies a second criterion. In response to the absolute difference not satisfying the second criterion, the particular ground reflection is included in a refined set of ground reflections. For each particular test ego velocity in the set of test ego velocity and each particular ground reflection in the refined set of ground reflections, a test radial velocity is generated based on the particular test ego velocity, the particular ground reflection, the corresponding range, and the height of the radar system.

An absolute difference between the test radial velocity and the corresponding measured radial velocity and whether the absolute difference satisfies the first criterion is determined. In response to the absolute difference not satisfying the first criterion, the absolute difference is accumulated into a second total cost for the particular test ego velocity. After determining a second total cost for each test ego velocity in the set of test ego velocities, the second total costs for the set of test ego velocities are compared to obtain an updated smallest total cost and a corresponding updated particular test ego velocity. The updated particular test ego velocity can be used as the ego velocity of the radar system.

In some implementations, obtaining the set of ground reflections and corresponding ranges and radial velocities includes obtaining received radar signals from the radar system, performing transforms on the received radar signals to obtain a range-doppler-antenna cube, and performing object detection on the range-doppler-antenna cube to obtain detected range-doppler cells. The set of ground reflections and the corresponding ranges and radial velocities are determined from the detected range-doppler cells. In some implementations, the method further includes refining radial velocities of the detected range-doppler cells based on the ego velocity of the radar system and constructing multiple-input multiple-output array measurement vectors for the detected range-doppler cells. The directions of arrival for objects indicated by the detected range-doppler cells are estimated based on the array measurement vectors to obtain positions of the objects and motion states of the objects are determined based on the positions of the objects, the ego velocity of the radar system, and the refined radial velocities.

In some implementations, the radar system is affixed to a vehicle. In some examples, the radar system is forward-facing relative to the vehicle, and generating the test radial velocity for each particular test ego velocity and each particular ground reflection includes determining a longitudinal distance Y between the radar system and a ground reflection point corresponding to the particular ground reflection and determining the test radial velocity, which can be represented as:

$$\mathrm{Vr\_test} = -2(Vtest)\left(\frac{Y}{R}\right),$$

wherein Vr_test represents the test radial velocity, Vtest represents the particular test ego velocity, and R represents the corresponding range.

A non-transitory computer-readable medium stores machine instructions which, when executed by at least one processor, cause the at least one processor to obtain a set of ground reflections and corresponding ranges and radial velocities from a radar system and determine a set of test ego velocities. For each particular test ego velocity in the set of test ego velocities and each particular ground reflection in the set of ground reflections, the machine instructions cause the processor to generate a test radial velocity based on the particular test ego velocity, the particular ground reflection, the corresponding range, and a height of the radar system.

The machine instructions cause the processor to determine an absolute difference between the test radial velocity and the corresponding measured radial velocity and whether the absolute difference satisfies a criterion. In response to the absolute difference not satisfying the criterion, the machine instructions cause the processor to accumulate the absolute difference into a total cost for the particular test ego velocity. After a total cost is determined for each test ego velocity in the set of test ego velocities, the machine instructions cause the processor to compare the total costs for the set of test ego velocities to obtain a smallest total cost and a corresponding test ego velocity. The corresponding test ego velocity can be used as an ego velocity of the radar system.

In some implementations, the criterion is a first criterion and the total costs are first total costs. The non-transitory computer-readable medium further includes machine instructions that cause the processor to determine, for each particular ground reflection in the set of ground reflections, an absolute difference between the corresponding measured radial velocity and the particular test ego velocity and whether the absolute difference satisfies a second criterion. In response to the absolute difference not satisfying the second criterion, the machine instructions cause the processor to include the particular ground reflection in a refined set of ground reflections. The machine instructions further cause the processor to generate, for each particular test ego velocity in the set of test ego velocities and for each particular ground reflection in the refined set of ground reflections, a test radial velocity based on the particular test ego velocity, the particular ground reflection, the corresponding range, and the height of the radar system.

The machine instructions cause the processor to determine an absolute difference between the test radial velocity and the corresponding measured radial velocity and whether the absolute difference satisfies the first criterion. In response to the absolute difference not satisfying the first criterion, the machine instructions cause the processor to accumulate the absolute difference into a second total cost for the particular test ego velocity. After a second total cost is determined for each test ego velocity in the set of test ego velocities, the machine instructions cause the processor to compare the second total costs for the set of test ego velocities to obtain an updated smallest total cost and a corresponding updated particular test ego velocity. The updated particular test ego velocity can be used as an ego velocity of the radar system.

In some implementations, the radar system is affixed to a vehicle and forward-facing relative to the vehicle, and the non-transitory computer-readable medium includes machine instructions that cause the processor to, for each particular test ego velocity and each particular ground reflection, generate the test radial velocity by determining a longitudinal distance Y between the radar system and a ground reflection point corresponding to the particular ground reflection and determining the test radial velocity. The longitudinal distance Y can be represented as:

$$Y = \sqrt{(R)^2 - (H)^2},$$

wherein R represents the corresponding range and H represents the height of the radar system. The test radial velocity is represented as:

$$\mathrm{Vr\_test} = -2(Vtest)\left(\frac{Y}{R}\right),$$

wherein Vr_test represents the test radial velocity and Vtest represents the particular test ego velocity.

In some implementations, the radar system is rear-facing relative to the vehicle, and the machine instructions cause the processor to, for each particular test ego velocity and each particular ground reflection, generate the test radial velocity by determining a longitudinal distance Y between the radar system and a ground reflection point corresponding to the particular ground reflection and determining the test radial velocity. The test radial velocity is represented as:

$$\mathrm{Vr\_test} = 2(Vtest)\left(\frac{Y}{R}\right),$$

wherein Vr_test represents the test radial velocity, Vtest represents the particular test ego velocity, and R represents the corresponding range.

In some implementations, the radar system is affixed to a vehicle and rear-facing relative to the vehicle, and the non-transitory computer-readable medium further includes machine instructions that cause the processor to, for each particular test ego velocity and each particular ground reflection, generate the test radial velocity by determining a longitudinal distance Y between the radar system and a ground reflection point corresponding to the particular ground reflection and determining the test radial velocity. The longitudinal distance Y can be represented as:

$$Y = \sqrt{(R)^2 - (H)^2},$$

wherein R represents the corresponding range and H represents the height of the radar system. The test radial velocity is represented as:

$$\text{Vr\_test} = 2(Vtest)\left(\frac{Y}{R}\right),$$

wherein Vr_test represents the test radial velocity and Vtest represents the particular test ego velocity.

In some implementations, the radar system is affixed to a vehicle and faces sideways relative to the vehicle, and each test ego velocity comprises an ego speed Vtest and an angle θ. The non-transitory computer-readable medium further includes machine instructions that cause the processor to, for each particular test ego velocity and each particular ground reflection, generate the test radial velocity by determining a longitudinal distance Y between the radar system and a ground reflection point corresponding to the particular ground reflection and determining the test radial velocity. The longitudinal distance Y can be represented as:

$$Y = \sqrt{(R)^2 - (H)^2},$$

wherein R represents the corresponding range and H represents the height of the radar system. The test radial velocity is represented as:

$$\text{Vr\_test} = -2\left(\left(\frac{(Xb)Y}{R}\right)(Vtest)\sin(\theta) + \left(\frac{(Yb)Y}{R}\right)(Vtest)\cos(\theta)\right),$$

wherein Vr_test represents the test radial velocity, Xb represents a lateral position of the radar system, and Yb represents a longitudinal position of the radar system.

What is claimed is:

1. A radar system, comprising:
   at least one transmitter (TX) antenna positioned to illuminate a ground surface;
   at least one receiver (RX) antenna positioned to receive ground reflections;
   at least one processor; and
   at least one non-transitory computer-readable medium storing machine instructions which, when executed by the at least one processor, cause the at least one processor to:
   obtain a set of ground reflections and corresponding ranges and measured radial velocities;
   determine a set of test ego velocities;
   for each particular test ego velocity in the set of test ego velocities:
     for each particular ground reflection in the set of ground reflections:
       generate a test radial velocity based on the particular test ego velocity, the particular ground reflection, the corresponding range, and a height of the radar system relative to the ground surface;
       determine an absolute difference between the test radial velocity and a corresponding measured radial velocity;
       determine whether the absolute difference satisfies a criterion indicative of a maximum acceptable difference;
       in response to the absolute difference satisfying the criterion, accumulate the absolute difference into a total cost for the particular test ego velocity;
     accumulate the total cost for the particular test ego velocity into total costs for the set of test ego velocities;
   compare the total costs for the set of test ego velocities to obtain a smallest total cost and a corresponding particular test ego velocity; and
   use the corresponding particular test ego velocity as an ego velocity of the radar system.

2. The radar system of claim 1, wherein the criterion is a first criterion and the total costs are first total costs, and wherein the machine instructions, when executed by the at least one processor, further cause the at least one processor to:
   for each particular ground reflection in the set of ground reflections:
     determine a second absolute difference between the corresponding measured radial velocity and the ego velocity;
     determine whether the second absolute difference satisfies a second criterion indicative of a second maximum acceptable difference;
     in response to the second absolute difference satisfying the second criterion, include the particular ground reflection in a refined set of ground reflections;
   for each particular test ego velocity in the set of test ego velocities:
     for each particular ground reflection in the refined set of ground reflections:
       generate a test radial velocity based on the particular test ego velocity, the particular ground reflection, a corresponding range, and the height of the radar system;
       determine an absolute difference between the test radial velocity and the corresponding measured radial velocity;
       determine whether the absolute difference satisfies the first criterion;
       in response to the absolute difference satisfying the first criterion, accumulate the absolute difference into a second total cost for the particular test ego velocity;
     accumulate the second total cost for the particular test ego velocity into second total costs for the set of test ego velocities;
   compare the second total costs for the set of test ego velocities to obtain an updated smallest total cost and a corresponding updated particular test ego velocity; and
   use the corresponding updated particular test ego velocity as the ego velocity of the radar system.

3. The radar system of claim 1, wherein the radar system is affixed to a vehicle.

4. The radar system of claim 3, wherein the radar system is forward-facing relative to the vehicle, and wherein the machine instructions to generate, for each particular test ego velocity and each particular ground reflection, the test radial velocity comprise instructions to:
   determine a longitudinal distance Y between the radar system and a ground reflection point corresponding to the particular ground reflection; and
   determine the test radial velocity, wherein the test radial velocity is represented as:

$$\text{Vr\_test} = -2(Vtest)\left(\frac{Y}{R}\right),$$

wherein Vr_test represents the test radial velocity, Vtest represents the particular test ego velocity, and R represents the corresponding range.

5. The radar system of claim 4, wherein the longitudinal distance Y between the radar system and the ground reflection point is represented as:

$$Y=\sqrt{(R)^2-(H)^2},$$

wherein H represents the height of the radar system.

6. The radar system of claim 3, wherein the radar system is rear-facing relative to the vehicle, and wherein the machine instructions to generate, for each particular test ego velocity and each particular ground reflection, the test radial velocity comprise instructions to:
   determine a longitudinal distance Y between the radar system and a ground reflection point corresponding to the particular ground reflection; and
   determine the test radial velocity, wherein the test radial velocity is represented as:

$$\mathrm{Vr\_test} = 2(Vtest)\left(\frac{Y}{R}\right),$$

wherein Vr_test represents the test radial velocity, Vtest represents the particular test ego velocity, and R represents the corresponding range.

7. The radar system of claim 3, wherein the radar system faces sideways relative to the vehicle and each test ego velocity comprises an ego speed Vtest and an angle θ, and wherein the machine instructions to generate, for each particular test ego velocity and each particular ground reflection, the test radial velocity comprise instructions to:
   determine a longitudinal distance Y between the radar system and a ground reflection point corresponding to the particular ground reflection; and
   determine the test radial velocity, wherein the test radial velocity is represented as:

$$\mathrm{Vr\_test} = -2\left(\left(\frac{(Xb)Y}{R}\right)(Vtest)\sin(\theta) + \left(\frac{(Yb)Y}{R}\right)(Vtest)\cos(\theta)\right),$$

wherein Vr_test represents the test radial velocity, Xb represents a lateral position of the radar system, Yb represents a longitudinal position of the radar system, and R represents the corresponding range.

8. The radar system of claim 1, wherein the machine instructions to obtain the set of ground reflections and corresponding ranges and radial velocities comprise instructions to:
   transmit radar signals from the at least one TX antenna;
   obtain received radar signals from the at least one RX antenna;
   perform transforms on the received radar signals to obtain a range-doppler-antenna cube;
   perform object detection on the range-doppler-antenna cube to obtain detected range-doppler cells; and
   determine, from the detected range-doppler cells, the set of ground reflections and the corresponding ranges and radial velocities.

9. The radar system of claim 8, wherein the machine instructions, when executed by the at least one processor, further cause the at least one processor to:
   refine radial velocities of the detected range-doppler cells based on the ego velocity of the radar system;
   construct multiple-input multiple-output (MIMO) array measurement vectors for the detected range-doppler cells;
   estimate directions of arrival for objects indicated by the detected range-doppler cells based on the array measurement vectors to obtain positions of the objects; and
   determine motion states of the objects based on the positions of the objects, the ego velocity of the radar system, and the refined radial velocities.

10. A method for determining an ego velocity of a radar system, comprising:
   obtaining, from the radar system, a set of ground reflections and corresponding ranges and radial velocities;
   determining a set of test ego velocities;
   for each particular test ego velocity in the set of test ego velocities:
      for each particular ground reflection in the set of ground reflections:
         generating a test radial velocity based on the particular test ego velocity, the particular ground reflection, the corresponding range, and a height of the radar system;
         determining an absolute difference between the test radial velocity and a corresponding measured radial velocity;
         determining whether the absolute difference satisfies a criterion indicative of a maximum acceptable difference;
         in response to the absolute difference satisfying the criterion, accumulating the absolute difference into a total cost for the particular test ego velocity
      accumulating the total cost for the particular test ego velocity into total costs for the set of test ego velocities;
   comparing the total costs for the set of test ego velocities to obtain a smallest total cost and a corresponding test ego velocity; and
   using the corresponding test ego velocity as an ego velocity of the radar system.

11. The method of claim 10, wherein the criterion is a first criterion and the total costs are first total costs, the method further comprising:
   for each particular ground reflection in the set of ground reflections:
      determining a second absolute difference between the corresponding measured radial velocity and the ego velocity;
      determining whether the second absolute difference satisfies a second criterion indicative of a second maximum acceptable difference;
      in response to the second absolute difference satisfying the second criterion, including the particular ground reflection in a refined set of ground reflections;
   for each particular test ego velocity in the set of test ego velocities:
      for each particular ground reflection in the refined set of ground reflections:
         generating a second test radial velocity based on the particular test ego velocity, the particular ground reflection, the corresponding range, and the height of the radar system;
         determining a third absolute difference between the second test radial velocity and the corresponding measured radial velocity;
         determining whether the third absolute difference satisfies the first criterion;

in response to the third absolute difference satisfying the first criterion, accumulating the third absolute difference into a second total cost for the particular test ego velocity;

accumulating the second total cost for the particular test ego velocity into second total costs for the set of test ego velocities;

comparing the second total costs for the set of test ego velocities to obtain an updated smallest total cost and a corresponding updated particular test ego velocity; and using the corresponding updated particular test ego velocity as the ego velocity of the radar system.

12. The method of claim 10, wherein obtaining the set of ground reflections and corresponding ranges and radial velocities comprises:

obtaining received radar signals from the radar system;

performing transforms on the received radar signals to obtain a range-doppler-antenna cube;

performing object detection on the range-doppler-antenna cube to obtain detected range-doppler cells; and determining, from the detected range-doppler cells, the set of ground reflections and the corresponding ranges and radial velocities.

13. The method of claim 12, further comprising:

refining radial velocities of the detected range-doppler cells based on the ego velocity of the radar system;

constructing multiple-input multiple-output (MIMO) array measurement vectors for the detected range-doppler cells;

estimating directions of arrival for objects indicated by the detected range-doppler cells based on the array measurement vectors to obtain positions of the objects; and determining motion states of the objects based on the positions of the objects, the ego velocity of the radar system, and the refined radial velocities.

14. The method of claim 10, wherein the radar system is affixed to a vehicle.

15. The method of claim 14, wherein the radar system is forward-facing relative to the vehicle, and wherein generating, for each particular test ego velocity and each particular ground reflection, the test radial velocity comprises:

determining a longitudinal distance Y between the radar system and a ground reflection point corresponding to the particular ground reflection; and determining the test radial velocity, wherein the test radial velocity is represented as:

$$\text{Vr\_test} = -2(Vtest)\left(\frac{Y}{R}\right),$$

wherein Vr_test represents the test radial velocity, Vtest represents the particular test ego velocity, and R represents the corresponding range.

16. A non-transitory computer-readable medium storing machine instructions which, when executed by at least one processor, cause the at least one processor to:

obtain a set of ground reflections and corresponding ranges and radial velocities from a radar system;

determine a set of test ego velocities;

for each particular test ego velocity in the set of test ego velocities:

for each particular ground reflection in the set of ground reflections:

generate a test radial velocity based on the particular test ego velocity, the particular ground reflection, the corresponding range, and a height of the radar system relative to a ground surface;

determine an absolute difference between the test radial velocity and a corresponding measured radial velocity;

determine whether the absolute difference satisfies a criterion indicative of a maximum acceptable difference;

in response to the absolute difference satisfying the criterion, accumulate the absolute difference into a total cost for the particular test ego velocity;

accumulate the total cost for the particular test ego velocity into total costs for the set of test ego velocities;

compare the total costs for the set of test ego velocities to obtain a smallest total cost and a corresponding test ego velocity; and use the corresponding test ego velocity as an ego velocity of the radar system.

17. The non-transitory computer-readable medium of claim 16, wherein the criterion is a first criterion and the total costs are first total costs, the machine instructions, when executed by the at least one processor, further cause the at least one processor to:

for each particular ground reflection in the set of ground reflections:

determine a second absolute difference between the corresponding measured radial velocity and the ego velocity;

determine whether the second absolute difference satisfies a second criterion indicative of a second maximum acceptable difference;

in response to the second absolute difference satisfying the second criterion, include the particular ground reflection in a refined set of ground reflections;

for each particular test ego velocity in the set of test ego velocities:

for each particular ground reflection in the refined set of ground reflections:

generate a second test radial velocity based on the particular test ego velocity, the particular ground reflection, the corresponding range, and the height of the radar system;

determine a third absolute difference between the second test radial velocity and the corresponding measured radial velocity;

determine whether the third absolute difference satisfies the first criterion;

in response to the third absolute difference satisfying the first criterion, accumulate the third absolute difference into a second total cost for the particular test ego velocity;

accumulate the second total cost for the particular test ego velocity into second total costs for the set of test ego velocities;

compare the second total costs for the set of test ego velocities to obtain an updated smallest total cost and a corresponding updated particular test ego velocity; and use the corresponding updated particular test ego velocity as the ego velocity of the radar system.

18. The non-transitory computer-readable medium of claim 16, wherein the radar system is affixed to a vehicle and forward-facing relative to the vehicle, wherein the machine instructions to generate, for each particular test ego velocity and each particular ground reflection, the test radial velocity comprise instructions to:
determine a longitudinal distance Y between the radar system and a ground reflection point corresponding to the particular ground reflection, wherein the longitudinal distance Y between the radar system and the ground reflection point is represented as:

$$Y=\sqrt{(R)^2-(H)^2},$$

wherein R represents the corresponding range, and H represents the height of the radar system; and
determine the test radial velocity, wherein the test radial velocity is represented as:

$$\mathrm{Vr\_test} = -2(Vtest)\left(\frac{Y}{R}\right),$$

wherein Vr_test represents the test radial velocity and Vtest represents the particular test ego velocity.

19. The non-transitory computer-readable medium of claim 16, wherein the radar system is affixed to a vehicle and rear-facing relative to the vehicle, wherein the machine instructions to generate, for each particular test ego velocity and each particular ground reflection, the test radial velocity comprise instructions to:
determine a longitudinal distance Y between the radar system and a ground reflection point corresponding to the particular ground reflection, wherein the longitudinal distance Y between the radar system and the ground reflection point is represented as:

$$Y=\sqrt{(R)^2-(H)^2},$$

wherein R represents the corresponding range, and H represents the height of the radar system; and
determine the test radial velocity, wherein the test radial velocity is represented as:

$$\mathrm{Vr\_test} = 2(Vtest)\left(\frac{Y}{R}\right),$$

wherein Vr_test represents the test radial velocity and Vtest represents the particular test ego velocity.

20. The non-transitory computer-readable medium of claim 16, wherein the radar system is affixed to a vehicle and faces sideways relative to the vehicle, wherein each test ego velocity comprises an ego speed Vtest and an angle θ, and wherein the machine instructions to generate, for each particular test ego velocity and each particular ground reflection, the test radial velocity comprise instructions to:
determine a longitudinal distance Y between the radar system and a ground reflection point corresponding to the particular ground reflection, wherein the longitudinal distance Y between the radar system and the ground reflection point is represented as:

$$Y=\sqrt{(R)^2-(H)^2},$$

wherein R represents the corresponding range, and H represents the height of the radar system; and
determine the test radial velocity, wherein the test radial velocity is represented as:

$$\mathrm{Vr\_test} = -2\left(\left(\frac{(Xb)Y}{R}\right)(Vtest)\sin(\theta) + \left(\frac{(Yb)Y}{R}\right)(Vtest)\cos(\theta)\right),$$

wherein Vr_test represents the test radial velocity, Xb represents a lateral position of the radar system, and Yb represents a longitudinal position of the radar system.

* * * * *